(12) United States Patent
Li et al.

(10) Patent No.: US 12,476,487 B2
(45) Date of Patent: Nov. 18, 2025

(54) WIRELESS CHARGING DEVICE AND WIRELESS CHARGING METHOD

(71) Applicant: Lanto Electronic Limited, Kunshan (CN)

(72) Inventors: Peng Li, Kunshan (CN); Bin Zhou, Kunshan (CN); Shuai Li, Kunshan (CN); Fuqiang Wang, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 0 days.

(21) Appl. No.: 18/891,763

(22) Filed: Sep. 20, 2024

(65) Prior Publication Data

US 2025/0132603 A1    Apr. 24, 2025

(30) Foreign Application Priority Data

Oct. 20, 2023   (CN) .......................... 202311368451.6

(51) Int. Cl.
*H02J 50/00* (2016.01)
*H02J 50/10* (2016.01)
*H02J 50/90* (2016.01)

(52) U.S. Cl.
CPC ............ *H02J 50/005* (2020.01); *H02J 50/10* (2016.02); *H02J 50/90* (2016.02)

(58) Field of Classification Search
CPC ........... H02J 50/005; H02J 50/90; H02J 50/10
USPC ...................................................... 307/104
See application file for complete search history.

(56) References Cited

U.S. PATENT DOCUMENTS

| | | | | |
|---|---|---|---|---|
| 2010/0259214 | A1* | 10/2010 | Sip ......................... | H02J 50/90 320/108 |
| 2019/0344668 | A1* | 11/2019 | Penney .................... | H02J 50/90 |
| 2020/0076242 | A1* | 3/2020 | Narayana Bhat ... | H02J 7/00034 |
| 2020/0169110 | A1* | 5/2020 | Yang ...................... | H02J 50/005 |
| 2020/0313471 | A1* | 10/2020 | Stingu .................... | H02J 50/10 |
| 2020/0389037 | A1* | 12/2020 | Chen ....................... | H02J 7/0044 |
| 2020/0412142 | A1* | 12/2020 | Chen ....................... | H02J 50/10 |

(Continued)

FOREIGN PATENT DOCUMENTS

| | | |
|---|---|---|
| CN | 219164309 U | 6/2023 |
| CN | 110661320 B | 8/2023 |
| CN | 113612321 B | 10/2023 |

*Primary Examiner* — Alfonso Perez Borroto
(74) *Attorney, Agent, or Firm* — Birch, Stewart, Kolasch & Birch, LLP

(57) ABSTRACT

A wireless charging device and wireless charging method are disclosed. By movably setting a transmitting coil module within the wireless charging device and obtaining the position signal of the receiving coil to transmit to the controller, and connecting the sliding rod of the sliding resistor to the transmitting coil module, so that the transmitting coil module drives the sliding rod to slide during the moving process. The controller determines the position information of the receiving coil based on the position signal and detects the current electrical parameters of the sliding resistor. According to the current electrical parameters, it determines the current position information of the transmitting coil module and controls the transmitting coil module to move, enabling the transmitting coil module to accurately position and charge wirelessly with the receiving coil. Thereby, the wireless charging device may adapt to charging devices with receiving coils at different heights.

20 Claims, 14 Drawing Sheets

(56) References Cited

U.S. PATENT DOCUMENTS

| | | | |
|---|---|---|---|
| 2021/0002170 A1* | 1/2021 | Chien | H05B 45/30 |
| 2021/0249880 A1* | 8/2021 | Taylor | H02J 7/02 |
| 2021/0376667 A1* | 12/2021 | Mehas | H02J 50/005 |

* cited by examiner

WIRELESS CHARGING DEVICE AND WIRELESS CHARGING METHOD

CLAIM OF PRIORITY AND CROSS-REFERENCE TO RELATED APPLICATION

This application claims the benefit of Chinese Patent Application No. 202311368451.6, filed on Oct. 20, 2023, which is incorporated herein by reference in its entirety.

BACKGROUND OF THE INVENTION

1. Field of the Invention

The present invention relates to the field of wireless charging, and particularly to a wireless charging device and wireless charging method.

2. Description of the Related Art

In daily life, people often need to charge charging devices (such as mobile phones, tablet computers, etc.). Due to the cumbersome connection wires, susceptibility to damage, and limited mobility of traditional wired charging methods, wireless charging devices have emerged to effectively overcome these issues, providing a more flexible and convenient charging method for users.

In existing technologies, wireless charging devices are usually designed according to the model or type of the device to be charged. Specifically, the transmitting coil is fixed at a predetermined position within the wireless charging device, and the AC signal is transmitted to the transmitting coil, causing the transmitting coil to generate a changing magnetic field, thereby inducing a current in the receiving coil of the device to be charged when it is within the range of this magnetic field, achieving wireless charging.

On the one hand, since charging devices of different models or types usually have receiving coils at different heights, the existing technology of fixing the transmitting coil at a predetermined position within the wireless charging device cannot adapt to charging devices with receiving coils at different heights. On the other hand, the existing technology of designing dedicated wireless charging devices according to the model or type of the device to be charged leads to higher costs and poorer user experience.

BRIEF DESCRIPTION OF THE INVENTION

In view of this, an embodiment of the present disclosure provides a wireless charging device that may solve the above problems in the prior art.

In the first aspect, the present disclosure provides a wireless charging device, which includes: a transmitting coil module, the transmitting coil module is movably set within the wireless charging device, and is configured to obtaining a position signal of a receiving coil; a sliding resistor, including a sliding rod, the sliding rod is connected to the transmitting coil module, enabling the transmitting coil module to drive the sliding rod to slide during the moving process; a controller, electrically connected to the sliding resistor, the controller is configured to determining a position information of the receiving coil based on the position signal transmitted from the transmitting coil module and detecting current electrical parameters of the sliding resistor, and determining a current position information of the transmitting coil module according to the current electrical parameters, and controlling the transmitting coil module to move, enabling the transmitting coil module to position and charge wirelessly with the receiving coil.

In the second aspect, the present disclosure provides a wireless charging method, which includes: obtaining a position signal of a receiving coil and current electrical parameters of a sliding resistor; determining, according to the position signal, a position information of the receiving coil; determining, based on a predetermined correspondence between the electrical parameters of the sliding resistor and the position information of the transmitting coil module and according to the current electrical parameters of the sliding resistor, a current position information of the transmitting coil module; controlling, according to the position information of the receiving coil and the current position information of the transmitting coil module, the transmitting coil module to move, enabling the transmitting coil module to position and charge wirelessly with the receiving coil.

The present disclosure, by movably setting the transmitting coil module within the wireless charging device, and obtaining the position signal of the receiving coil to transmit to the controller, and connecting the sliding rod of the sliding resistor to the transmitting coil module, so that the transmitting coil module drives the sliding rod to slide during the moving process, enables the controller to determine the position information of the receiving coil based on the position signal, and detect the current electrical parameters of the sliding resistor, and determine the current position information of the transmitting coil module according to the current electrical parameters, and control the transmitting coil module to move, enabling the transmitting coil module to position and charge wirelessly with the receiving coil. Thereby, the wireless charging device may adapt to charging devices with receiving coils at different heights, and accurately position the transmitting coil module with the receiving coil for wireless charging, which has high applicability and improves the user experience.

DETAILED DESCRIPTION OF EMBODIMENTS OF THE INVENTION

Figure 1:
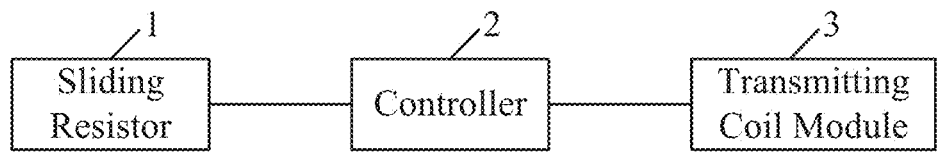
FIG. 1 is a circuit diagram of the wireless charging device according to an embodiment of the present disclosure.

Several preferred embodiments of the present disclosure will be described in detail in conjunction with the accompanying drawings as follows, however, the present disclosure is intended to encompass any substitutions, modifications, equivalents, etc., made thereto without departing from the spirit and scope of the present disclosure. In order to provide those skilled in the art with thorough understanding of the present disclosure, particular details will be described below in the preferred embodiments of the present disclosure, although those skilled in the art can understand the present disclosure without the description of these details.

In addition, it should be understood by those skilled in the art that the accompanying drawings are provided herein for purposes of illustration and that the accompanying drawings are not necessarily to scale.

Furthermore, it should be understood that the terms "circuit" used herein refer to conductive circuits formed by at least one component or sub-circuit that are electrically or electromagnetically connected. When an element or circuit is referred to as "connected to" another element or "connected between" two nodes, it may be directly coupled or connected to another element or there may be intermediate elements, and the connection between elements may be physical, logical, or a combination thereof. Conversely, when an element is referred to as "directly coupled to" or "directly connected to" another element, it means that there are no intermediate elements between the two.

Unless otherwise specified and limited, the terms "mounted," "connected," "fixed," and similar terms should be broadly understood, for example, they may be fixed connections or detachable connections, or integrated; they may be mechanical connections or electrical connections; they may be directly connected or indirectly connected through intermediate media, and can be an internal connection or interaction relationship between two elements, unless otherwise specified. To those skilled in the art, the specific meaning of the above terms in this disclosure may be understood on a case-by-case basis.

For ease of illustration, spatially relative terms such as "inside," "outside," "below," "underneath," "lower part," "upper part," "above," etc., are used herein to describe the relationship between one component or feature and another component or feature in the drawings. It will be understood that spatially relative terms may encompass different orientations of the device during use or operation other than those depicted in the figures. For example, if the device in the figures is flipped, the component described as being "below" or "underneath" another component or feature will then be positioned as being "above" that other component or feature. Thus, the example term "below" may encompass both above and below orientations. The device may be oriented in other ways (rotated 90 degrees or in other orientations), and the spatially relative descriptive words used herein should be interpreted accordingly.

Unless the context clearly requires otherwise, the terms "include," "comprise," and similar terms throughout the specification should be interpreted as meaning "including but not limited to," that is, they have an inclusive meaning rather than an exhaustive one.

In the description of the present application, it should be understood that the terms "first," "second," and so on are used for descriptive purposes only and should not be construed as indicating or implying relative importance. Furthermore, in the description of the present application, unless otherwise specified, the term "multiple" means two or more.

In the following description, the wireless charging device and method are described in the context of charging a mobile phone (i.e., the device to be charged). The device to be charged is an electronic device with functions such as data transmission, data processing, data storage, human-computer interaction, and wireless charging. It should be understood that the wireless charging device and method of the present disclosure may also be designed for various charging scenarios, and the device to be charged may also be a tablet computer, smart home devices, etc.

FIG. 1 is a circuit diagram of the wireless charging device according to an embodiment of the present disclosure. As shown in FIG. 1, the wireless charging device according to this embodiment includes a sliding resistor 1, a controller 2, and a transmitting coil module 3. The controller 2 is electrically connected to the sliding resistor 1 and the transmitting coil module 3.

In this embodiment, the transmitting coil module 3 is movably set within the wireless charging device. The sliding resistor 1 includes a sliding rod that is connected to the transmitting coil module 3. Thus, as the transmitting coil module 3 moves, it drives the sliding rod to slide, so that the sliding resistor 1 has an electrical parameter that corresponds to the position of the transmitting coil module 3. In the following description, the electrical parameter of the sliding resistor 1 is exemplified by representing the voltage value of the sliding resistor 1.

In this embodiment, due to the related technology that designs the wireless charging method by fixing the transmitting coil at a predetermined position within the wireless charging device according to the model or type of the device to be charged, it is not possible to adapt to charging devices with receiving coils at different heights, leading to higher costs and poor user experience. To address this situation, this embodiment of the present disclosure uses the controller 2 to determine the current position information of the transmitting coil module 3 and the current position information of the receiving coil of the device to be charged, to control the movement of the transmitting coil module 3 for accurate positioning and charging. Specifically, the wireless charging method of this embodiment may refer to FIG. 2.

Figure 2:
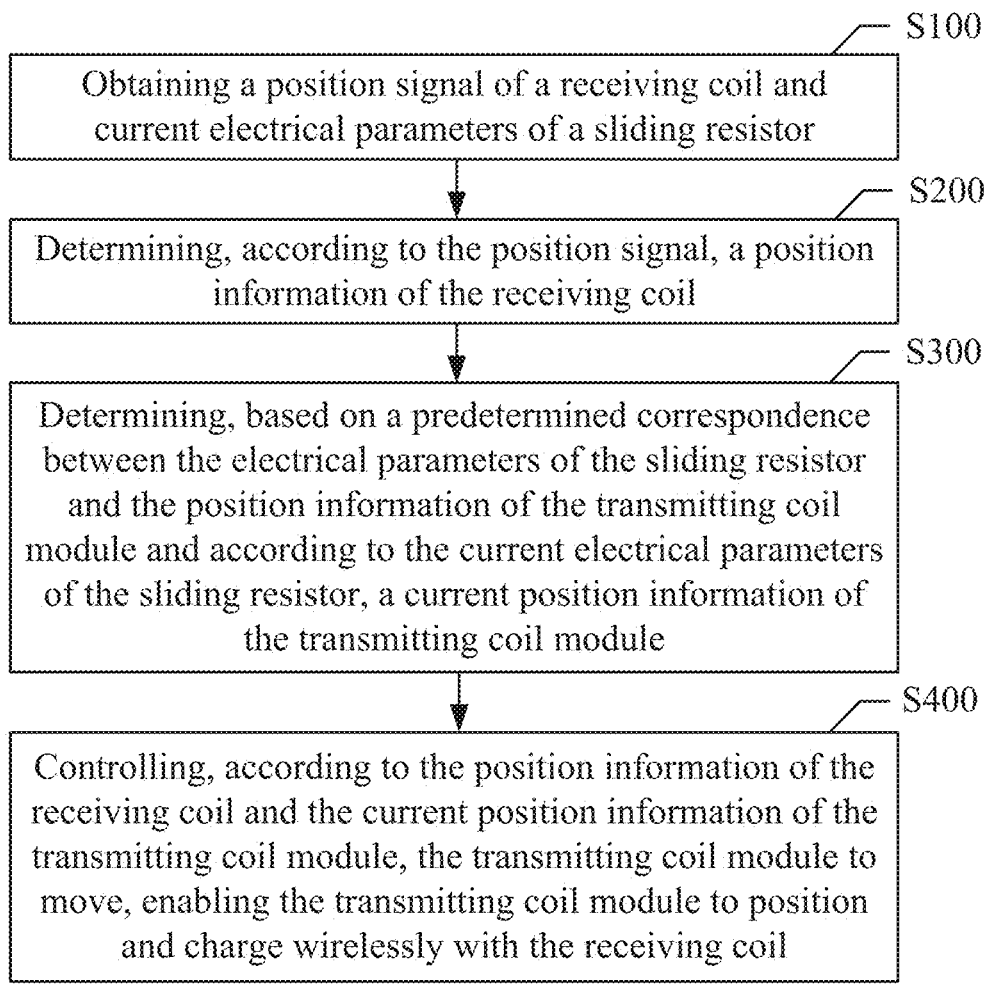
FIG. 2 is a flowchart of the wireless charging method according to an embodiment of the present disclosure.

FIG. 2 is a flowchart of a wireless charging method according to an embodiment of the present disclosure. As shown in FIG. 2, the wireless charging process in this embodiment includes the following steps:

Step S100: Obtaining a position signal of a receiving coil and current electrical parameters of a sliding resistor.

In this embodiment, the controller 2 obtains the position signal of the receiving coil of the device to be charged and the current electrical parameter of the sliding resistor 1. Optionally, the transmitting coil module 3 may obtain the position signal sent by the receiving coil of the device to be charged and transmit it to the controller 2. The controller 2 may also detect the current electrical parameter of the sliding resistor 1.

Step S200: Determining, according to the position signal, a position information of the receiving coil.

In this embodiment, the controller 2 determines the corresponding position information according to the position signal of the receiving coil of the device to be charged.

Step S300: Determining, based on a predetermined correspondence between the electrical parameters of the sliding resistor and the position information of the transmitting coil module and according to the current electrical parameters of the sliding resistor, a current position information of the transmitting coil module.

In this embodiment, the controller 2 determines the current position information of the transmitting coil module 3 based on the current electrical parameter of the sliding resistor 1, according to the predetermined correspondence between the electrical parameter of the sliding resistor 1 and the position information of the transmitting coil module 3. Optionally, since the transmitting coil module 3 may drive the sliding rod to slide as it moves, giving the sliding resistor 1 an electrical parameter that corresponds to the position of the transmitting coil module 3, the position information of the transmitting coil module 3 and the electrical parameter of the sliding resistor 1 may be correlated. Optionally, the position information of the transmitting coil module 3 at various positions during its movement may be recorded, and the electrical parameter of the sliding resistor 1 when the transmitting coil module 3 is at each position may be detected. Thus, the correspondence between the electrical parameter of the sliding resistor and the position information of the transmitting coil module is determined. For example, when the transmitting coil module 3 moves to a height a1, the corresponding voltage value b1 of the sliding resistor is detected and recorded. Similarly, when the transmitting coil module 3 moves to a height a2, the corresponding voltage value b2 of the sliding resistor is detected and recorded.

Step S400: Controlling, according to the position information of the receiving coil and the current position information of the transmitting coil module, the transmitting coil module to move, enabling the transmitting coil module to position and charge wirelessly with the receiving coil.

In this embodiment, the controller 2 controls the transmitting coil module 3 to move according to the current position information of the transmitting coil module 3 and the position information of the receiving coil of the device to be charged, so that the transmitting coil module 3 accurately positions with the receiving coil of the device to be charged for wireless charging. Thereby, the wireless charging device of this embodiment is able to adapt to charging devices with receiving coils at different heights and accurately position the transmitting coil module with the receiving coil for wireless charging, which has high applicability and improves the user experience. Optionally, an equivalent circuit diagram of the wireless charging device of this embodiment refers to FIG. 3.

Figure 3:
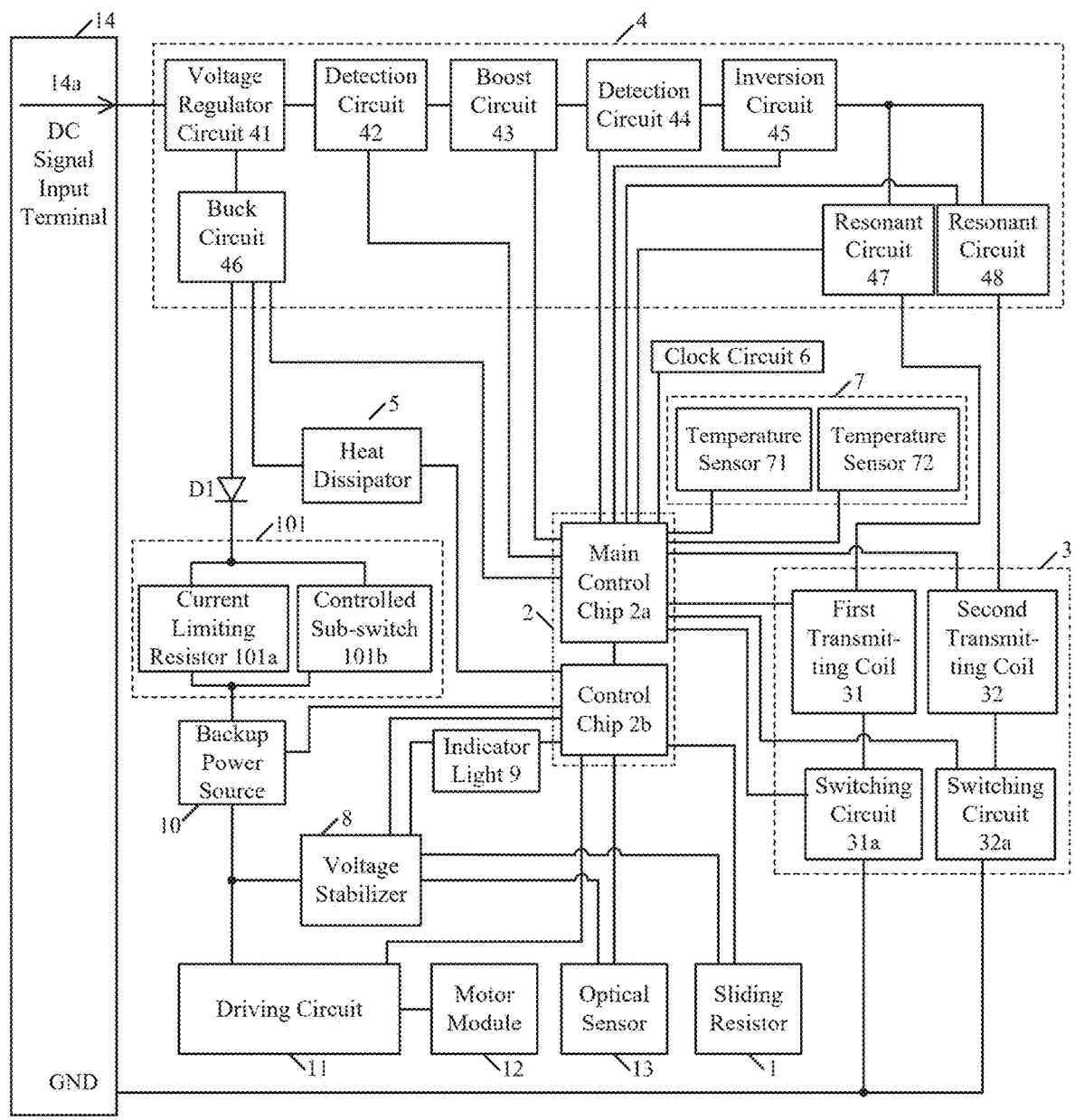
FIG. 3 is an equivalent circuit diagram of the wireless charging device according to an embodiment of the present disclosure.

FIG. 3 is an equivalent circuit diagram of the wireless charging device according to an embodiment of the present disclosure. As shown in FIG. 3, the wireless charging device of this embodiment includes a sliding resistor 1, a controller 2, a transmitting coil module 3, a power supply circuit 4, a heat dissipator 5, a clock circuit 6, multiple temperature sensors 7, a voltage stabilizer 8, an indicator light 9, a backup power source 10, a controlled switch 101, a driving circuit 11, a motor module 12, an optical sensor 13, and a power supply interface 14. The controller 2 includes a main control chip 2a and a control chip 2b. The transmitting coil module 3 includes a first transmitting coil 31, a second transmitting coil 32, and switching circuits 31a and 32a. The power supply circuit 4 includes a voltage regulator circuit 41, multiple detection circuits, a boost circuit 43, an inversion circuit 45, a buck circuit 46, and multiple resonant circuits, with multiple detection circuits including 42 and 44, and multiple resonant circuits including 47 and 48. Multiple temperature sensors 7 include temperature sensors 71 and 72. The controlled switch 101 includes a current limiting resistor 101a and a controlled sub-switch 101b.

In this embodiment, the controller 2 is used to achieve predetermined functions, and the controller 2 may be an electronic device with functions such as data transmission, data processing, data storage, and communication. This embodiment exemplifies the controller 2 as including separately set main control chip 2a and control chip 2b. It should be understood that the main control chip 2a and control chip 2b may also be integrated into one chip, that is, a chip that integrates the main control chip 2a and the control chip 2b may achieve the predetermined functions of the controller 2.

In this embodiment, the power supply interface 14 includes a direct current (DC) signal input terminal 14a and a ground terminal GND. The DC signal input terminal 14a is electrically connected to the voltage regulator circuit 41 of the power supply circuit 4. The ground terminal GND is electrically connected to the corresponding transmitting coil through the corresponding switching circuit, optionally, the ground terminal GND is electrically connected to the first transmitting coil 31 through the switching circuit 31a, and simultaneously, the ground terminal GND is electrically connected to the second transmitting coil 32 through the switching circuit 32*a*. The switching circuits 31*a* and 32*a* are electrically connected to the main control chip 2*a*. The power supply interface 14 is used to transmit the DC signal to the voltage regulator circuit 41 of the power supply circuit 4.

Optionally, the power supply interface 14 may be implemented through a Universal Serial Bus interface (USB) (such as USB Type-C interface, etc.), a dedicated power supply interface, etc. A dedicated power supply interface represents an interface designed according to the power supply requirements. For example, the dedicated power supply interface may be designed based on the power parameters of the DC signal required to be provided, the power parameters of the AC signal transmitted by the transmitting coil module 3, etc.

Optionally, the switching circuits 31*a* and 32*a* may be implemented through components such as transistors, resistors, diodes, etc.

In this embodiment, the voltage regulator circuit 41 is electrically connected to the DC signal input terminal 14*a* of the power supply interface 14, the detection circuit 42, and the buck circuit 46.

Optionally, the voltage regulator circuit 41 may be implemented through a transient voltage suppressor (TVS), etc. The transient voltage suppressor is characterized by low cost, low noise, stable output voltage, and high applicability.

In this embodiment, the detection circuit 42 is electrically connected to the voltage regulator circuit 41, the boost circuit 43, and the main control chip 2*a*. The boost circuit 43 is electrically connected to the detection circuit 42, the detection circuit 44, and the main control chip 2*a*.

Optionally, the boost circuit 43 may be implemented through a boost half-bridge circuit (BHB), etc.

In this embodiment, the detection circuit 44 is electrically connected to the boost circuit 43, the inversion circuit 45, and the main control chip 2*a*. The inversion circuit 45 is electrically connected to the detection circuit 44, the resonant circuits 47 and 48, and the main control chip 2*a*. Wherein the detection circuits 42 and 44 may be implemented through current sensing circuits (Current Sense). The inversion circuit 45 may be implemented through a full bridge circuit (FB).

In this embodiment, the resonant circuit 47 is electrically connected to the inversion circuit 45, the first transmitting coil 31, and the main control chip 2*a*. The resonant circuit 48 is electrically connected to the inversion circuit 45, the second transmitting coil 32, and the main control chip 2*a*. The resonant circuits 47 and 48 may be implemented through LC resonant circuits.

Optionally, this embodiment exemplifies the resonant circuits 47 and 48 set within the power supply circuit 4. It should be understood that the resonant circuits 47 and 48 involved in this embodiment may also be set within the transmitting coil module 3. Furthermore, this embodiment exemplifies the resonant circuits being electrically connected to the inversion circuit 45 and the corresponding transmitting coils, with the transmitting coils being electrically connected to the corresponding switching circuits. It should be understood that the resonant circuits, transmitting coils, and switching circuits involved in this embodiment may also be electrically connected in various ways according to requirements.

For example, the inversion circuit 45 is connected to the switching circuit 31*a* within the transmitting coil module 3, which in turn is connected to the resonant circuit 47 within the transmitting coil module 3, which is then connected to the first transmitting coil 31. Similarly, the inversion circuit 45 is connected to the switching circuit 32*a* within the transmitting coil module 3, which in turn is connected to the resonant circuit 48 within the transmitting coil module 3, which is then connected to the second transmitting coil 32.

For another example, the inversion circuit 45 is connected to the resonant circuit 47 within the transmitting coil module 3, which is then connected to the switching circuit 31*a* within the transmitting coil module 3, which is then connected to the first transmitting coil 31. Similarly, the inversion circuit 45 is connected to the resonant circuit 48 within the transmitting coil module 3, which is then connected to the switching circuit 32*a* within the transmitting coil module 3, which is then connected to the second transmitting coil 32.

In this embodiment, the temperature sensor 71 is electrically connected to the main control chip 2*a*. The temperature sensor 72 is electrically connected to the main control chip 2*a*. The temperature sensors 71 and 72 may be implemented through negative temperature coefficient thermistors (NTC).

In this embodiment, the first transmitting coil 31 is electrically connected to the resonant circuit 47, the switching circuit 31*a*, and the main control chip 2*a*. The second transmitting coil 32 is electrically connected to the resonant circuit 48, the switching circuit 32*a*, and the main control chip 2*a*.

In this embodiment, the buck circuit 46 is electrically connected to the voltage regulator circuit 41, the heat dissipator 5, the anode of diode D1, and the main control chip 2*a*. The buck circuit 46 may be implemented through a buck circuit, etc.

In this embodiment, the heat dissipator 5 is electrically connected to the buck circuit 46 and the control chip 2*b*. The heat dissipator 5 may be implemented through a fan, etc.

In this embodiment, the anode of diode D1 is electrically connected to the buck circuit 46, and the cathode of diode D1 is electrically connected to the backup power source 10 through the controlled switch 101. Optionally, the current limiting resistor 101*a* is connected between the cathode of diode D1 and the backup power source 10, and the controlled sub-switch 101*b* is connected between the cathode of diode D1 and the backup power source 10, with the current limiting resistor 101*a* and the controlled sub-switch 101*b* being paralleled.

Optionally, the controlled sub-switch 101*b* may be implemented through a transistor (such as a MOSFET, bipolar transistor, etc.). The resistance value of the current-limiting resistor 101*a*, for example, is 47 ohms.

Optionally, this embodiment exemplifies the controlled switch 101 as including a current limiting resistor 101*a* and a controlled sub-switch 101*b*. It should be understood that the controlled switch 101 may also be implemented through a power switch (PS), etc.

In this embodiment, the main control chip 2*a* is electrically connected to the detection circuits 42 and 44, the boost circuit 43, the inversion circuit 45, the buck circuit 46, the resonant circuits 47 and 48, the clock circuit 6, the temperature sensors 71 and 72, the switching circuits 31*a* and 32*a*, the first transmitting coil 31, and the second transmitting coil 32. The main control chip 2*a* may be implemented through a wireless transmission control chip (WTC) or the like, and the wireless transmit controller chip is, for example, a chip of model CPS8200 or the like.

In this embodiment, the clock circuit 6 is electrically connected to the main control chip 2*a* and is used to provide a clock signal for the main control chip 2*a*, enabling the various circuits in the wireless charging device shown in FIG. 3 to work synchronously. The clock circuit 6 may be implemented through a crystal oscillator (also known as a crystal), for example, a crystal oscillator with a frequency of 40 MHz.

In this embodiment, the voltage stabilizer 8 is electrically connected to the sliding resistor 1, the indicator light 9, the optical sensor 13, and the control chip 2b. The voltage stabilizer 8 may be implemented through a low dropout regulator (LDO), etc.

In this embodiment, the indicator light 9 is electrically connected to the voltage stabilizer 8 and the control chip 2b. The indicator light 9 may be implemented through a light-emitting diode (LED) or the like.

In this embodiment, the backup power source 10 is electrically connected to the cathode of diode D1 through the controlled switch 101, and simultaneously, the backup power source 10 is electrically connected to the voltage stabilizer 8, the driving circuit 11, and the control chip 2b. The backup power source 10 may be implemented through a supercapacitor (SC), etc.

In this embodiment, the driving circuit 11 includes a driving chip and a resistor, which are electrically connected to the resistor, the backup power source 10, and the control chip 2b. The driving chip may be implemented through a motor drive integrated circuit or the like.

Optionally, the voltage stabilizer 8 and the driving circuit 11 are also electrically connected to the cathode of diode D1.

In this embodiment, the motor module 12 includes a motor and a transmission mechanism. The driving chip in the driving circuit 11 is electrically connected to the motor in the motor module 12 through the resistor. The transmission mechanism in the motor module 12 is connected to the transmitting coil module 3. The motor in the motor module 12 is used to drive the transmission mechanism to move the transmitting coil module 3.

In this embodiment, the optical sensor 13 is electrically connected to the voltage stabilizer 8 and the control chip 2b. The optical sensor 13 may be implemented through a photosensitive chip (also known as a Light Sensor) or the like.

In this embodiment, the sliding resistor 1 is electrically connected to the voltage stabilizer 8 and the control chip 2b.

In this embodiment, the control chip 2b is electrically connected to the sliding resistor 1, the heat dissipator 5, the voltage stabilizer 8, the indicator light 9, the backup power source 10, the driving chip in the driving circuit 11, and the optical sensor 13. At the same time, the main control chip 2a is electrically connected to the control chip 2b, and the main control chip 2a and the control chip 2b may be connected to each other by a bus, which is, for example, an I2C bus (Inter Integrated Circuit, a bi-directional two-wire synchronous serial bus) or the like. That is, the main control chip 2a and the control chip 2b may communicate based on I2C signals.

In this embodiment, the main control chip 2a, the control chip 2b, and the driving chip in the driving circuit 11 are used to achieve predetermined functions. This embodiment exemplifies the main control chip 2a as a wireless transmission control chip and the driving chip as a motor drive chip. It should be understood that the main control chip 2a, the control chip 2b, and the driving chip of the driving circuit 11 in this embodiment may also be implemented through MCU (Microcontroller Unit), PLC (Programmable Logic Controller), FPGA (Field-Programmable Gate Array), DSP (Digital Signal Processor), or ASIC (Application Specific Integrated Circuit), etc. Furthermore, this embodiment exemplifies the driving chip and the resistor in the driving circuit 11 as being independently set. It should be understood that the resistor of the driving circuit 11 may also be integrated into the driving chip, enabling the driving chip to drive the motor in the motor module 12 to drive the transmission mechanism to move, such that the transmitting coil module 3 is accurately aligned with the receiving coil of the device to be charged for charging.

In this embodiment, the power supply circuit 4 is used to convert the DC signal provided by the power supply interface 14 into an AC signal to be sent, which is then transmitted to the transmitting coil module 3. Then, the transmitting coil module 3 transmits the AC signal to be sent to the receiving coil of the device to be charged for wireless charging. That is, the transmitting coil module 3 may generate a changing magnetic field based on the AC signal to be sent, thereby wirelessly charging the device to be charged.

Optionally, the power supply interface 14 first transmits the DC signal to the voltage regulator circuit 41 through the DC signal input terminal 14a. Wherein the voltage value of the DC signal, for example, is 5-20V. Then, the voltage regulator circuit 41 stabilizes the DC signal to obtain a regulated signal, and the regulated signal is transmitted to the boost circuit 43 through the detection circuit 42. The main control chip 2a detects the regulated signal through the detection circuit 42 to obtain the electrical parameters of the regulated signal (such as voltage value, current value, power value, etc.). Then, the main control chip 2a generates a corresponding control signal to be transmitted to the boost circuit 43 according to the electrical parameters of the regulated signal, driving the boost circuit 43 to boost the regulated signal to obtain a boosted signal, which is then transmitted to the inversion circuit 45 through the detection circuit 44. Wherein the voltage value of the boosted signal, for example, is 20-36V.

Furthermore, the main control chip 2a detects the boosted signal through the detection circuit 44 to obtain the electrical parameters of the boost signal. Then, the main control chip 2a generates a corresponding control signal to be transmitted to the inversion circuit 45 according to the electrical parameters of the boost signal, to drive the inversion circuit 45 to convert the boosted signal into an AC signal to be processed, and to transmit the AC signal to be processed to the resonant circuits 47 and 48, respectively.

Moreover, the resonant circuit 47 resonates the AC signal to be processed to obtain the AC signal to be sent, and then transmits the AC signal to be sent to the first transmitting coil 31. Similarly, the resonant circuit 48 may transmit the AC signal to be sent obtained by the resonance processing to the second transmitting coil 32. Then, the first transmitting coil 31 or the second transmitting coil 32 in the transmitting coil module 3 transmits the AC signal to be sent to the receiving coil of the device to be charged for wireless charging. The main control chip 2a may drive the transmitting coils in the transmitting coil module 3 to transmit the AC signal to be sent to the receiving coil of the device to be charged for wireless charging.

In this embodiment, the main control chip 2a may control the conduction state of the switching circuits to enable the corresponding transmitting coil to transmit the AC signal to be sent to the receiving coil of the device to be charged for wireless charging. For example, the main control chip 2a controls the transistor in the switching circuit 31a to be conductive, while the main control chip 2a controls the transistor in the switching circuit 32a to be off, enabling the first transmitting coil 31 to transmit the AC signal to be sent to the receiving coil of the device to be charged for wireless charging. Further, for example, the main control chip 2a controls the transistor in the switching circuit 31a to be off, while the main control chip 2a controls the transistor in the switching circuit 32a to be conductive, enabling the second transmitting coil 32 to transmit the AC signal to be sent to the receiving coil of the device to be charged for wireless charging. Thereby, it may be realized that the first transmitting coil 31 or the second transmitting coil 32 charges the device to be charged.

Optionally, the inversion circuit 45 may include an input filter circuit, an output filter circuit, and high-frequency switching elements. The high-frequency switching elements may be implemented through transistors, such as MOSFET (Metal Oxide Semiconductor Field-Effect Transistor), IGBT (Insulated Gate Bipolar Transistor), etc. Optionally, the input filter circuit filters the boosted signal to remove possible noise and interference, and then converts the filtered boosted signal into an AC electric signal to be filtered through a high-frequency switching element, and then filters the AC electric signal to be filtered through the output filtering circuit, in order to obtain the above-described AC signal to be processed. The main control chip 2a may drive the high-frequency switching elements to be in a high-frequency switching state, that is, continuously switching the connection and disconnection of the circuit, thereby generating the AC signal to be filtered. Therefore, the main control chip 2a may drive the high-frequency switching elements to be in different frequency switching states to produce AC signals to be filtered with different electrical parameters such as power values, voltage values, etc., enabling the transmitting coil module 3 to transmit AC signals with different power values, voltage values, etc., to the receiving coil of the device to be charged. That is, the main control chip 2a may control the charging power of the transmitting coil module 3 through the inversion circuit 45.

Optionally, the main control chip 2a may detect the Q value (also known as the quality factor) of the resonant circuits 47 and 48 to control the resonant circuits 47 and 48 to resonate the AC signal to be processed to obtain the AC signal to be sent. In the following description, the resonant circuit 47 is illustrated as an example. Optionally, the Q value represents the energy storage efficiency of the resonant circuit 47 near the predetermined frequency, a higher Q value indicates that the resonant circuit 47 has higher energy storage efficiency and selectivity near the predetermined frequency. Therefore, the main control chip 2a may generate a drive signal by means of FSK modulation (Frequency Shift Keying) or ASK modulation (Amplitude Shift Keying) according to the predetermined frequency represented by the Q value of the resonant circuit 47, to drive the resonant circuit 47 to resonate the AC signal to be processed, thereby enhancing the signal component at the predetermined frequency in the AC signal to be processed, obtaining the AC signal to be sent, and thus improving the wireless energy transmission efficiency and reducing energy loss. Wherein FSK modulation transmits digital messages through the frequency of the carrier, that is, the main control chip 2a may change the frequency of the drive signal through FSK modulation to drive the resonant circuit 47 to resonate the AC signal to be processed. ASK modulation transmits information by changing the amplitude of the carrier, that is, the main control chip 2a may change the amplitude of the drive signal through ASK modulation to drive the resonant circuit 47 to resonate the AC signal to be processed.

In this embodiment, the power supply circuit 4 is also used to charge the backup power source 10 when the wireless charging device is in a powered-on state, the powered-on state representing that the power supply interface 14 receives the DC signal provided by the external charging line, that is, the DC signal is detected by the control chip 2b. Optionally, the voltage regulator circuit 41 may also transmit the regulated signal to the buck circuit 46, and obtain the charging signal by the buck circuit 46 through the voltage reduction process of the regulated signal. Then, the buck circuit 46 transmits the charging signal to the backup power source 10 through diode D1 and the controlled switch 101 for charging the backup power source 10. Wherein the controlled sub-switch 101b of the controlled switch 101 may be controlled to shut off by the charging signal provided by the buck circuit 46 through diode D1, allowing the buck circuit 46 to transmit the charging signal to the backup power source 10 through diode D1 and the current-limiting resistor 101a for charging the backup power source 10. Wherein the diode D1 is used for voltage stabilization of the charging signal and protection circuitry. That is, when the wireless charging device is in the powered-on state, diode D1 may prevent the electrical signals from the backup power source 10, the driving circuit 11, and other circuits from being transmitted back to the power supply circuit 4 in the reverse direction, thereby achieving circuit protection and improving the safety of the wireless charging device.

Optionally, when the wireless charging device is powered on and the buck circuit 46 charges the backup power source 10 through diode D1, at the same time the buck circuit 46 supplies power to the voltage stabilizer 8 and the driving chip of the driving circuit 11 through diode D1. For example, the voltage stabilizer 8 and the driving circuit 11 may be electrically connected to the cathode of diode D1, and a switch (such as a transistor, etc.) may be set between the backup power source 10 and the voltage stabilizer 8 and the driving circuit 11. When the wireless charging device is in the powered-on state, the control chip 2b controls the switch to shut off, allowing the buck circuit 46 to supply power to the voltage stabilizer 8, the backup power source 10, and the driving chip in the driving circuit 11 through diode D1.

Optionally, when the wireless charging device is in the powered-on state and the buck circuit 46 charges the backup power source 10 through diode D1, the backup power source 10 supplies power to the voltage stabilizer 8 and the driving circuit 11. In the following description, the example where the buck circuit 46 charges the backup power source 10 through diode D1 and simultaneously supplies power to the voltage stabilizer 8 and the driving chip of the driving circuit 11 through diode D1 is used for illustration.

In this embodiment, the power supply circuit 4 is also used to supply power to the heat dissipator 5 and the main control chip 2a when the wireless charging device is powered on. Optionally, the buck circuit 46 may transmit the charging signal processed by buck processing to the heat dissipator 5 and the main control chip 2a for power supply, respectively.

Optionally, the power supply circuit 4 is also used to supply power to the transmitting coil module 3 when the wireless charging device is in the powered-on state. Optionally, the buck circuit 46 may be electrically connected to the first transmitting coil 31 and the second transmitting coil 32 in the transmitting coil module 3, and the buck circuit 46 may transmit the charging signal processed by buck processing to the first transmitting coil 31 and the second transmitting coil 32 for power supply. Wherein the charging signal is a direct current. That is, the power supply circuit 4 simultaneously provides the transmitting coil module 3 with the AC signal to be sent and direct current, which allows the transmitting coils of the transmitting coil module 3 to maintain the changing magnetic field of the AC signal to be sent, thereby enabling efficient and stable charging for the device to be charged.

In this embodiment, the power supply circuit 4 is also used to supply power to the sliding resistor 1, the control chip 2b, the indicator light 9, and the optical sensor 13 through the voltage stabilizer 8 when the wireless charging device is in the powered-on state. For example, the buck circuit 46 transmits the charging signal to the voltage stabilizer 8 through diode D1, the voltage stabilizer 8 stabilizes the charging signal to obtain the power supply signal, and then the voltage stabilizer 8 respectively transmits the power supply signal to the sliding resistor 1, the control chip 2b, the indicator light 9, and the optical sensor 13 for power supply. The voltage value of the charging signal processed by the buck circuit 46 after buck processing, for example, is 5V, and the voltage value of the power supply signal processed by the voltage stabilizer 8 after voltage stabilization, for example, is 3V.

In this embodiment, the backup power source 10 is used to supply power to the driving circuit 11 and the voltage stabilizer 8 when the wireless charging device is in a power-off state, the power-off state representing that the power supply interface 14 does not receive the DC signal provided by the external charging line, that is, the DC signal does not detect by the control chip 2b For example, a switch (such as a transistor, etc.) may be set between the backup power source 10 and the voltage stabilizer 8 and the driving circuit 11. When the wireless charging device is in a power-off state, the control chip 2b controls the switch to conduct, allowing the backup power source 10 to supply discharge signals to the driving circuit 11 and the voltage stabilizer 8 for power supply, to maintain the operation of the driving circuit 11 and the voltage stabilizer 8 for a period of time.

Optionally, the voltage values of the charging signal and the discharging signal are the same, for example, 5V.

Optionally, the controlled sub-switch 101b may be electrically connected to the control chip 2b. When the wireless charging device is in a power-off state, the control chip 2b may control the controlled sub-switch 101b to conduct, short-circuiting the current-limiting resistor 101a in parallel with the controlled sub-switch 101b to reduce conduction loss and extend the power supply time of the backup power source 10.

In this embodiment, the backup power source 10 is also used to supply power to the circuits/components in the wireless charging device when the wireless charging device is in a power-off state. For example, when the wireless charging device is in a power-off state, the backup power source 10 supplies power to the sliding resistor 1, the control chip 2b, the indicator light 9, and the optical sensor 13 through the voltage stabilizer 8. Specifically, the backup power source 10 transmits the discharge signal to the voltage stabilizer 8, the voltage stabilizer 8 stabilizes the discharge signal to obtain the power supply signal, and then the voltage stabilizer 8 respectively transmits the power supply signal to the sliding resistor 1, the control chip 2b, the indicator light 9, and the optical sensor 13 for power supply.

In this embodiment, the temperature sensors 71 and 72 are respectively used to detect the temperature information of the first transmitting coil 31 and the second transmitting coil 32 and transmit it to the main control chip 2a. The heat dissipator 5 is used for heat dissipation of the wireless charging device. Since the main control chip 2a and the control chip 2b may communicate based on I2C signals or the like, the main control chip 2a may drive the heat dissipator 5 to dissipate heat through the control chip 2b according to the temperature information.

Optionally, the control chip 2b may drive the heat dissipator 5 to dissipate heat through PWM signals (Pulse Width Modulation), and the heat dissipator 5 may dissipate heat at a rotation speed corresponding to the PWM signal. Correspondingly, the control chip 2b may detect the feedback signal of the heat dissipator 5 to determine the rotation speed of the heat dissipator 5. Furthermore, the PWM signal has a corresponding relationship with the temperature information, allowing the heat dissipator 5 to dissipate heat at a corresponding rotation speed when the transmitting coils are at different temperatures. The feedback signal, for example, is an FG signal (Frequency Generator).

Optionally, the control chip 2b may collect the current electrical parameters of the sliding resistor 1 through an Analog-to-Digital Converter (that is, ADC), and then the control chip 2b may determine the current position information of the transmitting coil module 3 according to the current electrical parameters of the sliding resistor 1.

In this embodiment, the indicator light 9 is used to indicate the working state of the wireless charging device, such as the powered-on state, power-off state, etc. The control chip 2b may drive the indicator light 9 to light up or go out.

Optionally, the indicator light 9 may adopt different lighting modes to display the working state of the wireless charging device. The lighting modes, for example, include intermittent flashing (that is, flashing once every predetermined time), color changes, gradually dimming/brightening, etc. Furthermore, the lighting mode of the indicator light 9, the charging power of the transmitting coil module 3, and the fan speed represented by the PWM signal have a preset corresponding relationship. For example, when the transmitting coil module 3 uses the first charging power to charge the device to be charged, the corresponding indicator light 9 flashes every 1 second, and the corresponding heat dissipator 5 has the first rotation speed. When the transmitting coil module 3 uses the second charging power to charge the device to be charged, the corresponding indicator light 9 flashes every 2 seconds, and the corresponding heat dissipator 5 has the second rotation speed. Wherein, the first charging power is greater than the second charging power, and the first rotation speed is greater than the second rotation speed. That is to say, the wireless charging device may use preset multiple charging power levels to charge the device to be charged, which has high applicability and may improve the user experience.

In this embodiment, the optical sensor 13 is used to detect the optical signal and transmit it to the control chip 2b. The control chip 2b and the optical sensor 13 may communicate based on I2C, enabling the optical sensor 13 to transmit the optical signal to the control chip 2b.

In this embodiment, the driving circuit 11 is used to provide a driving signal to the motor module 12, enabling the motor module 12 to drive the transmitting coil module 3 to move to a height corresponding to the driving signal. The control chip 2b may control the driving circuit 11 to generate the driving signal. Optionally, the control chip 2b may send a control signal to the driving chip of the driving circuit 11, enabling the driving chip to generate a driving signal corresponding to the control signal. Then, the driving chip in the driving circuit 11 transmits the driving signal to the motor in the motor module 12 through the resistor, enabling the motor to drive the transmission mechanism to move the transmitting coil module 3 to a height corresponding to the driving signal. The control signal, for example, is a PWM signal. It is understood that the driving signal has a corresponding relationship with the height to which the transmitting coil module 3 moves. For example, if the drive signal characterizes a voltage of $c_1$ V (volts), the transmitter coil module 3 moves to a height a1.

In this embodiment, the resistor in the driving circuit 11 is used for circuit protection. Optionally, the control chip 2b is electrically connected to the resistor in the driving circuit 11, and the control chip 2b detects the driving signal through the resistor. If the current value represented by the driving signal is greater than a predetermined current value, the control chip 2b stops providing the control signal to the driving chip, causing the driving chip to stop outputting the driving signal to turn off the motor. That is, considering that the motor module 12 may have motor blockages or other situations, which cause an increase in the current represented by the driving signal, the controller 2 needs to control the motor to shut down for protection at this time. Thereby, the safety of the wireless charging device is improved.

Optionally, after the control chip 2b controls the motor to shut down when the current value represented by the driving signal is greater than the predetermined current value, the control chip 2b controls the driving circuit 11 to provide the driving signal again after a predetermined duration. If the current value represented by the driving signal detected through the resistor is less than or equal to the predetermined current value, the driving circuit 11 may be controlled to continuously output the driving signal. If the current value represented by the driving signal is still greater than the predetermined current value, the control chip 2b may use the indicator light 9 to indicate to the user that the wireless charging device has a fault, and/or the control chip 2b may use the main control chip 2a to send a fault message to the device to be charged, waiting for subsequent processing by the user.

In this embodiment, by movably setting the transmitting coil module 3 within the wireless charging device, the transmitting coil module may be positioned for charging with the receiving coil of the device to be charged. Optionally, the transmitting coil module 3 may be in a retracted state or an extended state. The retracted state represents the transmitting coil module 3 retracting within the wireless charging device, and the extended state represents the transmitting coil module 3 moving outside the wireless charging device. Optionally, refer to FIGS. 4 and 5.

Figure 4:
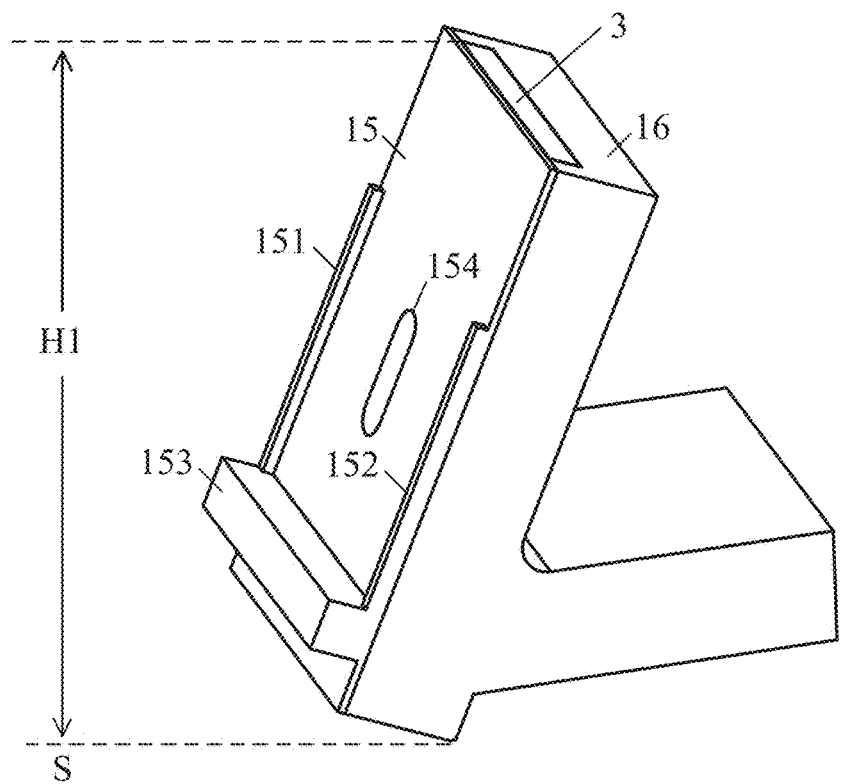
FIG. 4 is a side view of the wireless charging device with the transmitting coil module in a retracted state according to an embodiment of the present disclosure.
Figure 5:
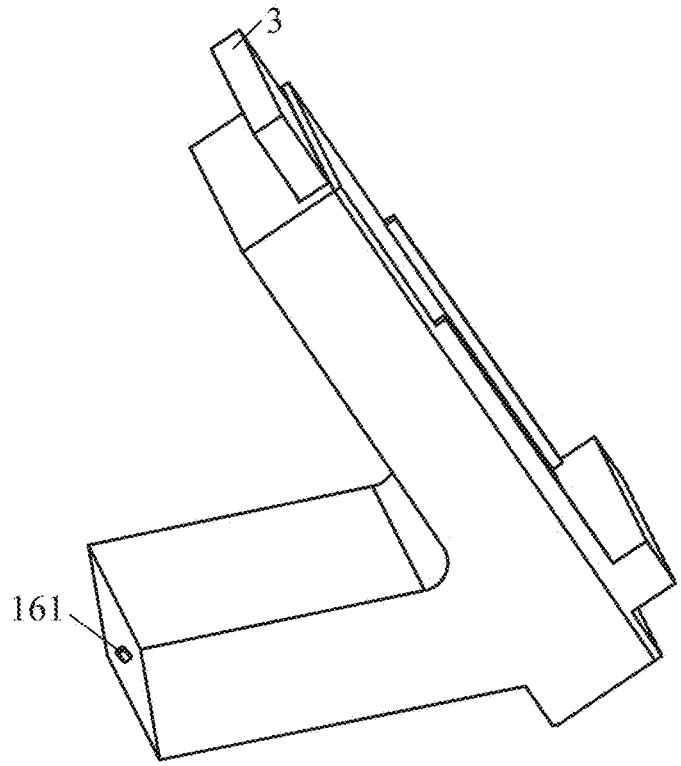
FIG. 5 is a side view of the wireless charging device with the transmitting coil module in an extended state according to an embodiment of the present disclosure.

FIGS. 4 and 5 are side views of the transmitting coil module in a retracted state and an extended state of the wireless charging device according to this embodiment. First, refer to FIG. 4, the wireless charging device of this embodiment also includes a first housing 15 and a second housing 16. The first housing 15 includes a first protruding part 151, a second protruding part 152, a third protruding part 153, and a first light guide hole 154. Wherein, the transmitting coil module 3 retracts within the wireless charging device. For the retracted state, the transmitting coil module 3 has a first height. For example, the height H1 of the transmitting coil module 3 from the bottom of the wireless charging device to the horizontal plane S is 103.9 mm.

In this embodiment, the first protruding part 151, the second protruding part 152, and the third protruding part 153 are used to support the device to be charged, allowing the device to be charged to be placed on the wireless charging device for wireless charging.

In this embodiment, then refer to FIG. 5, the second housing 16 includes a charging port 161. Wherein the transmitting coil module 3 moves outside the wireless charging device.

Optionally, the first housing 15 may also include a second light guide hole. The second light guide hole may be set below the third protruding part 153. The second light guide hole may include an indicator light 9. It should be understood that this embodiment exemplifies the second light guide hole set below the third protruding part 153, but the second light guide hole of this embodiment may also be set according to user needs, for example, the second light guide hole may be set above the first light guide hole 154. Thereby, while meeting user needs, the aesthetics of the wireless charging device is improved. Furthermore, the cross-sectional views of this embodiment's wireless charging device may refer to FIGS. 6 and 7.

Figure 6:
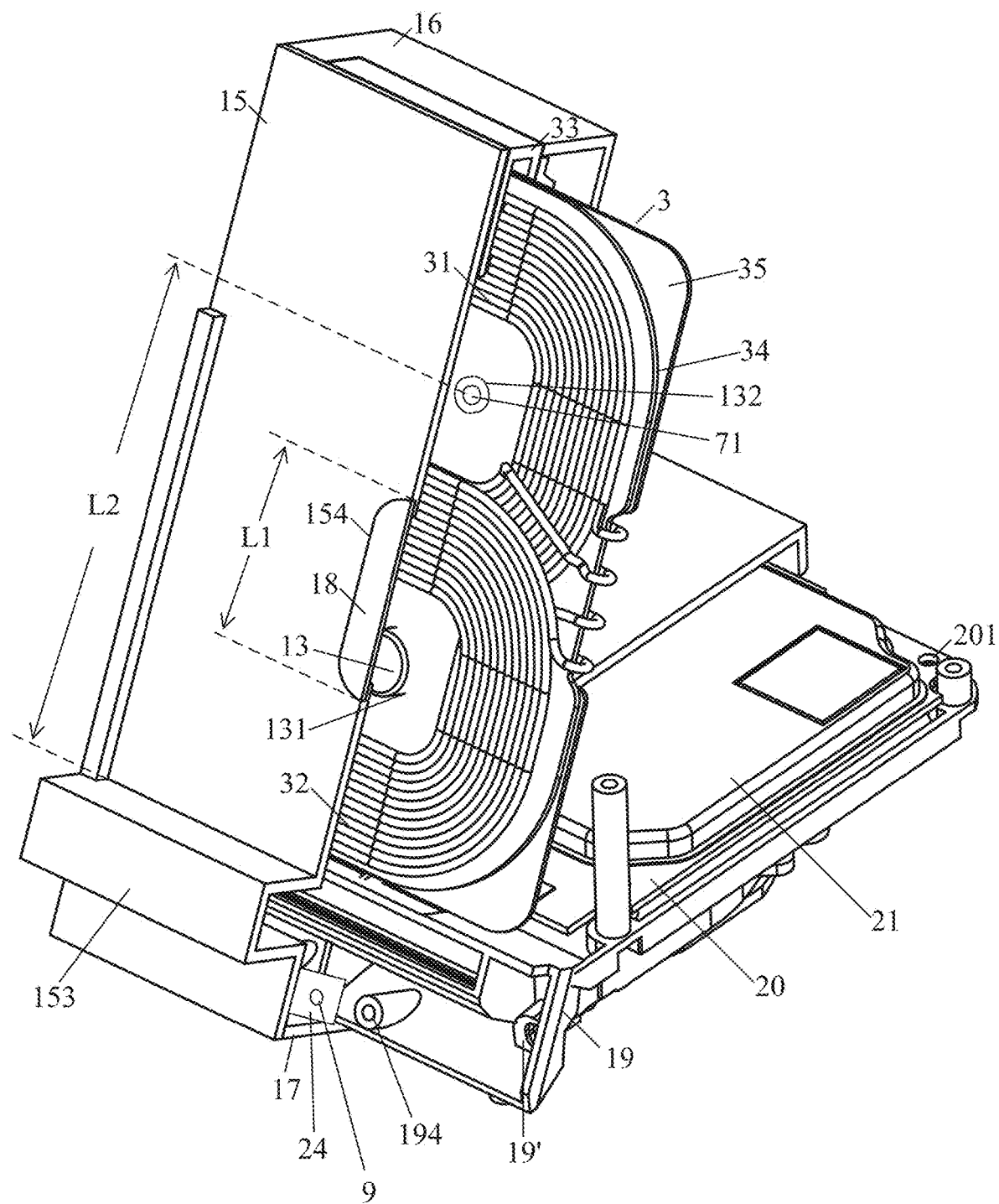
FIG. 6 is a cross-sectional view of the wireless charging device according to an embodiment of the present disclosure.
Figure 7:
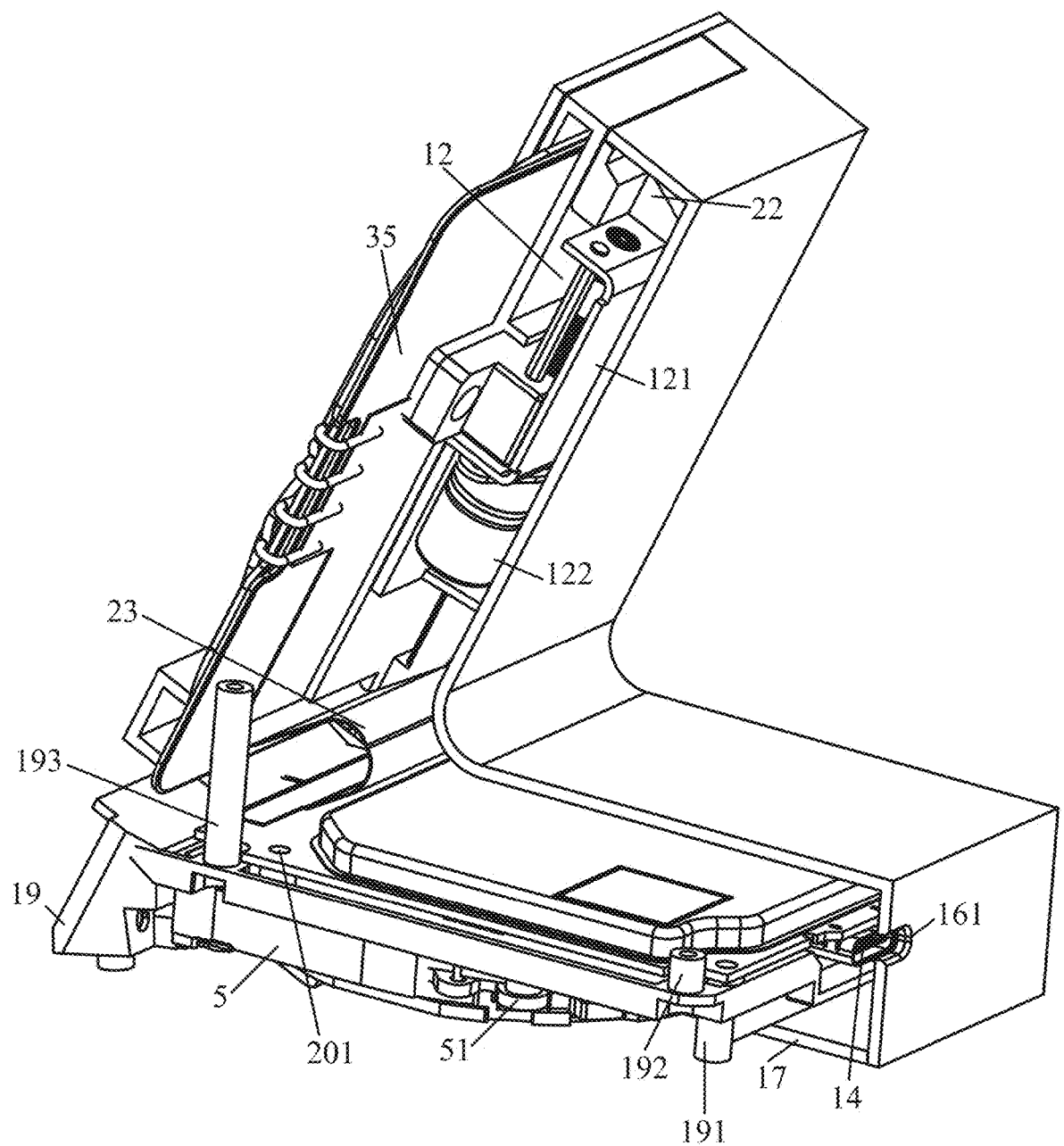
FIG. 7 is a cross-sectional view of the wireless charging device according to another embodiment of the present disclosure.

FIGS. 6 and 7 are cross-sectional views of the wireless charging device according to this embodiment. As shown in FIGS. 6 and 7, the wireless charging device of this embodiment also includes a third housing 17, a light guide plate 18, a first support member 19, a circuit board 20, a shielding cover 21, a second support member 22, and a flexible circuit board 23.

In this embodiment, the light guide plate 18 is set in the first light guide hole 154. The light guide plate 18 may be made of materials with high light transmittance, such as plastics (such as polyethylene, polypropylene, polyvinyl chloride, etc.), glass, transparent resins, etc.

In this embodiment, the transmitting coil module 3 includes a first transmitting coil 31, a second transmitting coil 32, a fourth housing 33, a magnetic shielding plate 34, and a metal plate 35. The first transmitting coil 31, the second transmitting coil 32, the magnetic shielding plate 34, and the metal plate 35 are set within the fourth housing 33, and the fourth housing 33 is movably set within the wireless charging device. The first transmitting coil 31 and the second transmitting coil 32 are set on one side of the magnetic shielding plate 34, the other side of the magnetic shielding plate 34 is set on one side of the metal plate 35, and the other side of the metal plate 35 has a flexible circuit board 23. One side of the flexible circuit board 23 is connected to the circuit board 20, and the other side extends to the other side of the metal plate 35. At the same time, the first transmitting coil 31 and the second transmitting coil 32 are connected to the flexible circuit board 23 to connect with the circuit board 20 through the flexible circuit board 23. The circuit board 20 may be implemented through a PCB circuit board (Printed Circuit Board). The flexible circuit board 23 is also known as an FPC (Flexible Printed Circuit Board), and the flexible circuit board 23 is a type of printed circuit board made of flexible materials (such as polyimide or polyester film). Compared to the circuit board 20, the flexible circuit board 23 has advantages such as bendable, rollable, foldable, and reducing the volume of the wireless charging device. Therefore, during the movement of the transmitting coil module 3, the first transmitting coil 31 and the second transmitting coil 32 may connect with the circuit board 20 through the flexible circuit board 23.

In this embodiment, the first transmitting coil 31 and the second transmitting coil 32 are used to wirelessly transmit the AC signal to be sent to the receiving coil of the device to be charged. Optionally, the first transmitting coil 31 and the second transmitting coil 32 may generate a changing magnetic field according to the AC signal to be sent transmitted by the resonant circuits 47 and 48, enabling the receiving coil of the device to be charged to produce an induced current when it is within the range of this magnetic field, achieving wireless charging.

In this embodiment, the first transmitting coil 31 and the second transmitting coil 32 are set at different heights within the transmitting coil module 3, allowing the wireless charging device to charge the receiving coil of the device to be charged through the first transmitting coil 31 or the second transmitting coil 32. Wherein, when the transmitting coil module 3 is in a retracted state, the transmitting coil module 3 has a first height. For example, when the transmitting coil module 3 is in a retracted state, the distance L2 between the center of the first transmitting coil 31 and the third protruding part 153 is 61 mm. The distance between the center of the second transmitting coil 32 and the third protruding part 153 is 27 mm. The distance between the top of the fourth housing 33 of the transmitting coil module 3 and the bottom of the third housing 17 at the horizontal plane S is 91 mm. The height H1 of the top of the fourth housing 33 of the transmitting coil module 3 from the horizontal plane S is 103.9 mm.

In this embodiment, the position information of the transmitting coil module 3 may represent the height between the top of the fourth housing 33 and the bottom of the third housing 17 at the horizontal plane. The position information of the transmitting coil module 3 may also represent the height between the center/top edge of the first transmitting coil 31 and/or the second transmitting coil 32 and the horizontal plane at the bottom of the third housing 17. The position information of the transmitting coil module 3 may also represent the distance between the center/top edge of the first transmitting coil 31 and/or the second transmitting coil 32 and the third protruding part 153. In the following description, the position information of the transmitting coil module 3 is exemplified by representing the height between the top of the fourth housing 33 and the bottom of the third housing 17 at the horizontal plane.

In this embodiment, the magnetic shielding plate 34 is used to isolate and concentrate the magnetic field generated by the first transmitting coil 31 and the second transmitting coil 32 (hereinafter referred to as the transmitting coil). That is, the magnetic shielding plate 34 may ensure that the magnetic field is concentrated within the predetermined range of the transmitting coil, thereby improving the power transmission efficiency of the transmitting coil, and the magnetic shielding plate 34 also helps reduce the impact of the magnetic field generated by the transmitting coil on other circuit components within the wireless charging device.

Optionally, the magnetic shielding plate 34 may be implemented through magnetic shielding materials such as ceramics, plastics, etc.

In this embodiment, the metal plate 35 is used to reflect the magnetic field generated by the transmitting coil, that is, to reflect the magnetic field generated by the transmitting coil to the receiving coil of the device to be charged, thereby improving the power transmission efficiency of the transmitting coil. At the same time, the metal plate 35 is also used for heat dissipation of the transmitting coil, allowing the transmitting coil to dissipate heat in time.

Optionally, the metal plate 35 may be implemented through metal materials such as aluminum plates, aluminum alloy plates, iron plates, copper plates, etc.

In this embodiment, the light guide plate 18 has a predetermined length L1. Correspondingly, the first light guide hole 154 has a length that is compatible with the light guide plate 18, allowing the light guide plate 18 to be set in the first light guide hole 154. At the same time, the magnetic shielding plate 34 and the metal plate 35 both have a first hollow part 131, and the optical sensor 13 is connected to the flexible circuit board 23 through the first hollow part 131, allowing the transmitting coil module 3 to drive the optical sensor 13 to move during the moving process. Wherein, the first hollow part 131 is set corresponding to the light guide plate 18, allowing the moving range of the optical sensor 13 during the movement of the transmitting coil module 3 to be within the length L, thereby enabling the optical sensor 13 to determine whether the device to be charged is placed on the wireless charging device by detecting the optical signal. Further, when the device to be charged is placed on the wireless charging device, the first light guide hole 154 is blocked, causing the optical sensor 13 to detect an optical signal strength less than the threshold value. When the device to be charged is not placed on the wireless charging device, the first light guide hole 154 is not blocked, causing the optical sensor 13 to detect an optical signal strength greater than or equal to the threshold value. Then, the optical sensor 13 transmits the detected optical signal to the control chip 2*b* in the controller 2, and the control chip 2*b* may determine whether the device to be charged is placed on the wireless charging device by comparing the intensity of the optical signal with the threshold value.

In this embodiment, the first support member 19 includes one or more first screw fixing holes 191, and the third housing 17 includes one or more first positioning holes corresponding to the first screw fixing holes 191. Therefore, the first support member 19 may be fixed above the third housing 17 through screws. Wherein the third housing 17 is set at the bottom of the wireless charging device and is used to support the wireless charging device.

In this embodiment, the first support member 19 also includes one or more second screw fixing holes 192, and the second housing 16 includes one or more second positioning holes corresponding to the second screw fixing holes 192. Therefore, the first support member 19 and the second housing 16 may be fixed through screws.

In this embodiment, the first support member 19 also includes one or more first connecting parts 19', and the first housing 15 includes one or more second connecting parts corresponding to the first connecting parts 19'. Therefore, the first support member 19 and the first housing 15 may be fixed through screws or bolts.

In this embodiment, the first support member 19 also includes one or more first positioning rods 193, and the second support member 22 includes one or more third positioning holes corresponding to the first positioning rods 193, allowing the second support member 22 to be fixed above the first support member 19 through the first positioning rods 193 and the corresponding third positioning holes.

In this embodiment, the circuit board 20 includes one or more third screw fixing holes 201, and the first support member 19 also includes one or more third positioning holes corresponding to the third screw fixing holes 201. Therefore, the circuit board 20 may be fixed above the first support member 19 through screws.

In this embodiment, the power supply circuit 4, clock circuit 6, voltage regulator 8, backup power source 10, controlled switch 101, and others shown in the circuit diagram of the wireless charging device in FIG. 3 may be designed and implemented using discrete components (such as capacitors, resistors, diodes, crystal oscillators, transistors, etc.) and are set on the circuit board 20. Similarly, the controller 2 and driving circuit 11 may also be set on the circuit board 20.

In this embodiment, the shielding cover 21 is set above the circuit board 20 and is used to reduce interference signals, improve circuit performance, and protect the circuits on the circuit board 20. It is understood that the shielding cover 21 is set between the circuit board 20 and the second housing 16. Since the first transmitting coil 31 and the second transmitting coil 32 is able to generate a changing magnetic field, the shielding cover 21 may reduce the impact of electromagnetic interference signals on the circuits on the circuit board 20, thereby improving circuit performance. At the same time, considering the possibility of the wireless charging device being bumped when the user using it, since the shielding cover 21 has a certain toughness and impact resistance, it may protect the circuits on the circuit board 20.

Optionally, the shielding cover 21 may be implemented through a metal shielding cover (such as an aluminum shielding cover, a copper shielding cover, etc.), a carbon fiber shielding cover, etc.

In this embodiment, the heat dissipator 5 includes one or more screw fixing parts 51, and the first support member 19 also includes one or more fourth positioning holes corresponding to the screw fixing parts 51. Therefore, the heat dissipator 5 is fixed below the first support member 19 through screws. It is understood that the heat dissipator 5 is set between the first support member 19 and the third housing 17. The heat dissipator 5 is used for heat dissipation of the wireless charging device.

In this embodiment, the temperature sensors 71 and 72 are respectively used to detect the temperature information of the first transmitting coil 31 and the second transmitting coil 32 and transmit it to the main control chip 2a. In the following description, the setting method of the temperature sensor 71 is exemplified.

In an optional implementation, the magnetic shielding plate 34 and the metal plate 35 both have a second hollow part 132, which is located at the center of the first transmitting coil 31. The temperature sensor 71 is connected to the flexible circuit board 23 through the second hollow part 132, and then connected to the circuit board 20 through the flexible circuit board 23. Similarly, the temperature sensor 72 may also be set at the center of the second transmitting coil 32 in the manner described above. Thereby, the temperature sensors 71 and 72 may accurately detect the temperature information of the first transmitting coil 31 and the second transmitting coil 32.

In another optional implementation, the temperature sensor 71 is set at a position corresponding to the center of the first transmitting coil 31 on the flexible circuit board 23. Similarly, the temperature sensor 72 is set at a position corresponding to the center of the second transmitting coil 32 on the flexible circuit board 23. Thereby, the space of the transmitting coil module 3 is saved. In the following description, the example where the temperature sensors 71 and 72 are set on the flexible circuit board 23 is used for illustration.

In this embodiment, the charging port 161 is compatible with the power supply interface 14, allowing the power supply interface 14 to be set in the charging port 161. At the same time, the power supply interface 14 is set below the circuit board 20 and is connected to the circuit board 20, allowing the charging line (such as a Type-C line, a dedicated charging line, etc.) to be connected to the power supply interface 14 to provide a DC signal.

Optionally, the wireless charging device also includes an indicator light board 24 (e.g., an LED light board), and the indicator light board 24 includes an indicator light 9. The first support member 19 also includes one or more fourth screw fixing holes 194, and the indicator light board 24 includes one or more fourth positioning holes corresponding to the fourth screw fixing holes 194. Therefore, the indicator light board 24 and the first support member 19 may be fixed through screws. Furthermore, the indicator light board 24 also includes a light guide column, which is set corresponding to the indicator light 9. Correspondingly, the first housing 15 also includes a second light guide hole, and the second light guide hole is set corresponding to the light guide column, and the second light guide hole is compatible with the light guide column, allowing the light guide column to be set in the second light guide hole.

In this embodiment, the motor module 12 is set in the second support member 22. The motor module 12 includes a transmission mechanism 121 and a motor 122. The transmission mechanism 121 is connected to the fourth housing 33 of the transmitting coil module 3, enabling the motor 122 to drive the transmission mechanism 121 to move the transmitting coil module 3, thereby enabling the first transmitting coil 31 or the second transmitting coil 32 of the transmitting coil module 3 to accurately position and charge with the receiving coil of the device to be charged. Furthermore, the exploded view of the wireless charging device of this embodiment may refer to FIG. 8.

Figure 8:
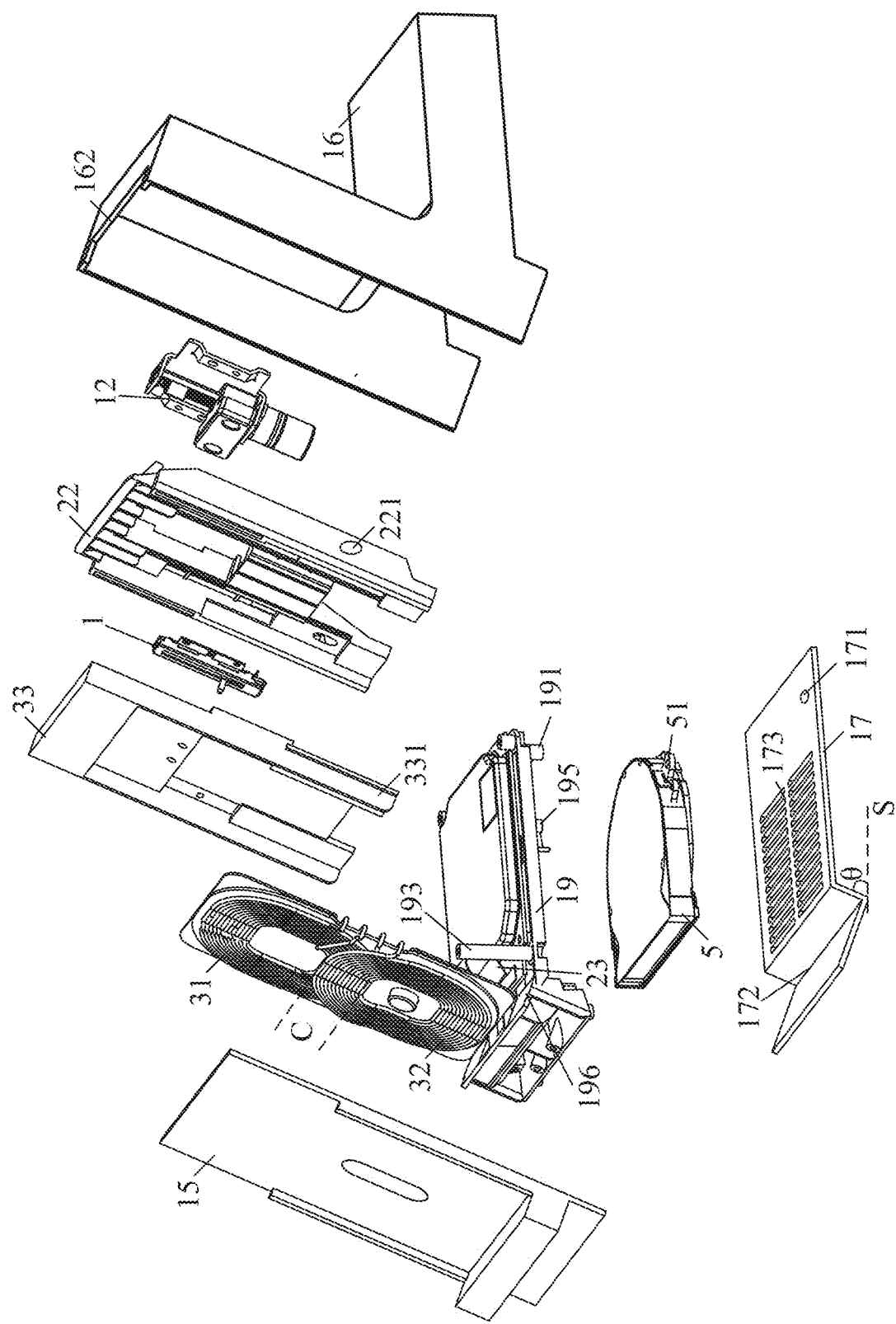
FIG. 8 is an exploded view of the wireless charging device according to an embodiment of the present disclosure.

FIG. 8 is an exploded view of the wireless charging device according to this embodiment. As shown in FIG. 8, the third housing 17 includes a first positioning hole 171, a fourth protruding part 172, and a heat dissipation hole 173. The first positioning hole 171 is correspondingly set with the first screw fixing hole 191 of the first support member 19, so the first support member 19 may be fixed above the third housing 17 through screws. The fourth protruding part 172 is used to support the wireless charging device, allowing the third housing 17 to have a predetermined angle θ with the horizontal plane S when placed on the horizontal plane S, thereby allowing the heat dissipation hole 173 to have a certain distance from the horizontal plane S, to improve the heat dissipation efficiency of the heat dissipator 5 through the heat dissipation hole 173. The heat dissipation hole 173 includes a plurality of sub-heat dissipation holes spaced apart, and the heat dissipation hole 173 is correspondingly set with the heat dissipator 5.

In this embodiment, the second support member 22 includes a third positioning hole 221. The third positioning hole 221 is correspondingly set with the first positioning rod 193 of the first support member 19. Therefore, the second support member 22 is fixed above the first support member 19 through the first positioning rod 193 and the third positioning hole 221.

In this embodiment, the first support member 19 includes a fourth positioning hole 195. The fourth positioning hole 195 is correspondingly set with the screw fixing part 51 of the heat dissipator 5. Therefore, the heat dissipator 5 is fixed below the first support member 19 through screws.

In this embodiment, the first transmitting coil 31, the second transmitting coil 32, the magnetic shielding plate 34, and the metal plate 35 are set within the fourth housing 33, and the fourth housing 33 is movably set within the wireless charging device. The fourth housing 33 includes a first supporting part 331, and the first support member 19 includes a second supporting part 196. Wherein, the second supporting part 196 is used to carry the second supporting part 196 when the transmitting coil module 3 is in a retracted state, to fix the transmitting coil module 3.

In this embodiment, the second housing 16 also includes a first opening 162. The first opening 162 is compatible with the fourth housing 33 of the transmitting coil module 3, allowing the fourth housing 33 to move through the first opening 162.

Optionally, the first transmitting coil 31 and the second transmitting coil 32 have an overlapping part C. The overlapping part C may be increased according to the premise of ensuring the normal operation of the first transmitting coil 31 and the second transmitting coil 32, thereby reducing the size of the wireless charging device and making the wireless charging device convenient to carry.

In this embodiment, the fourth housing 33, the sliding resistor 1, the second support member 22, the motor module 12, and the second housing 16 are sequentially set. Optionally, the sliding resistor 1 and the motor module 12 may be set in the second support member 22, and the transmission mechanism 121 of the motor module 12 is connected to the fourth housing 33 of the transmitting coil module 3, enabling the motor 122 to drive the transmission mechanism 121 to move the fourth housing 33. Furthermore, the side views of the fourth housing 33, sliding resistor 1, second support member 22, and motor module 12 may be respectively referred to in FIGS. 9 to 14.

Figure 9:
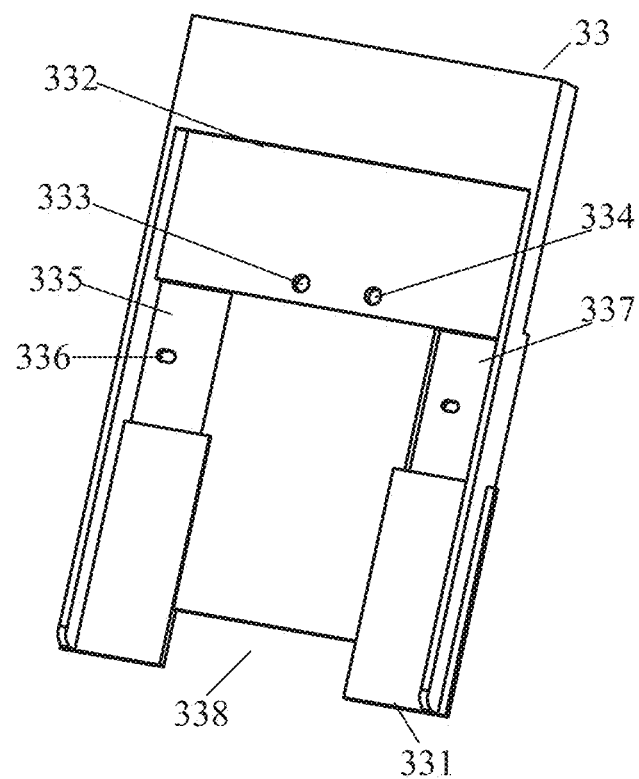
FIG. 9 is a side view of the fourth housing of the wireless charging device according to an embodiment of the present disclosure.
Figure 10:
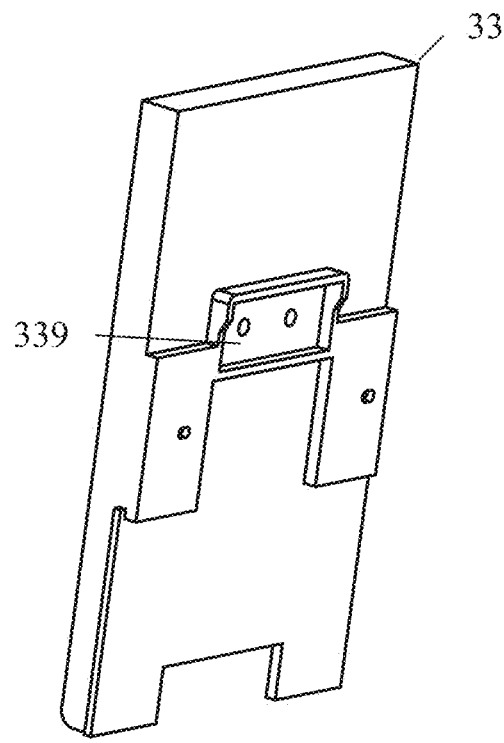
FIG. 10 is a side view of the fourth housing of the wireless charging device according to another embodiment of the present disclosure.
Figure 11:
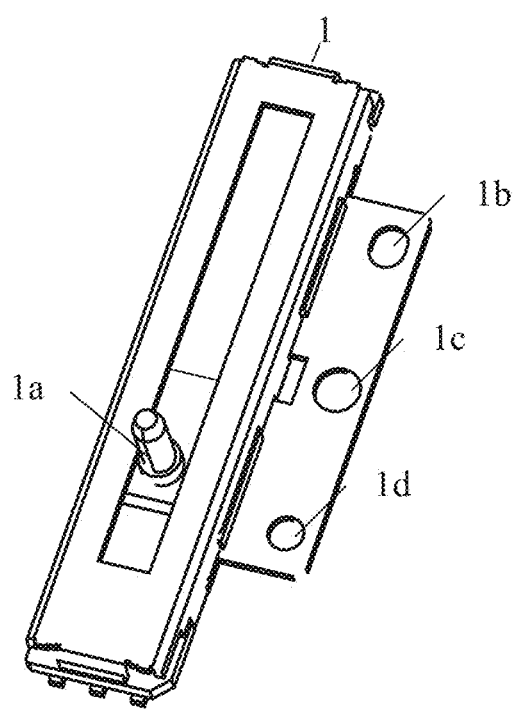
FIG. 11 is a side view of the sliding resistor of the wireless charging device according to an embodiment of the present disclosure.
Figure 12:
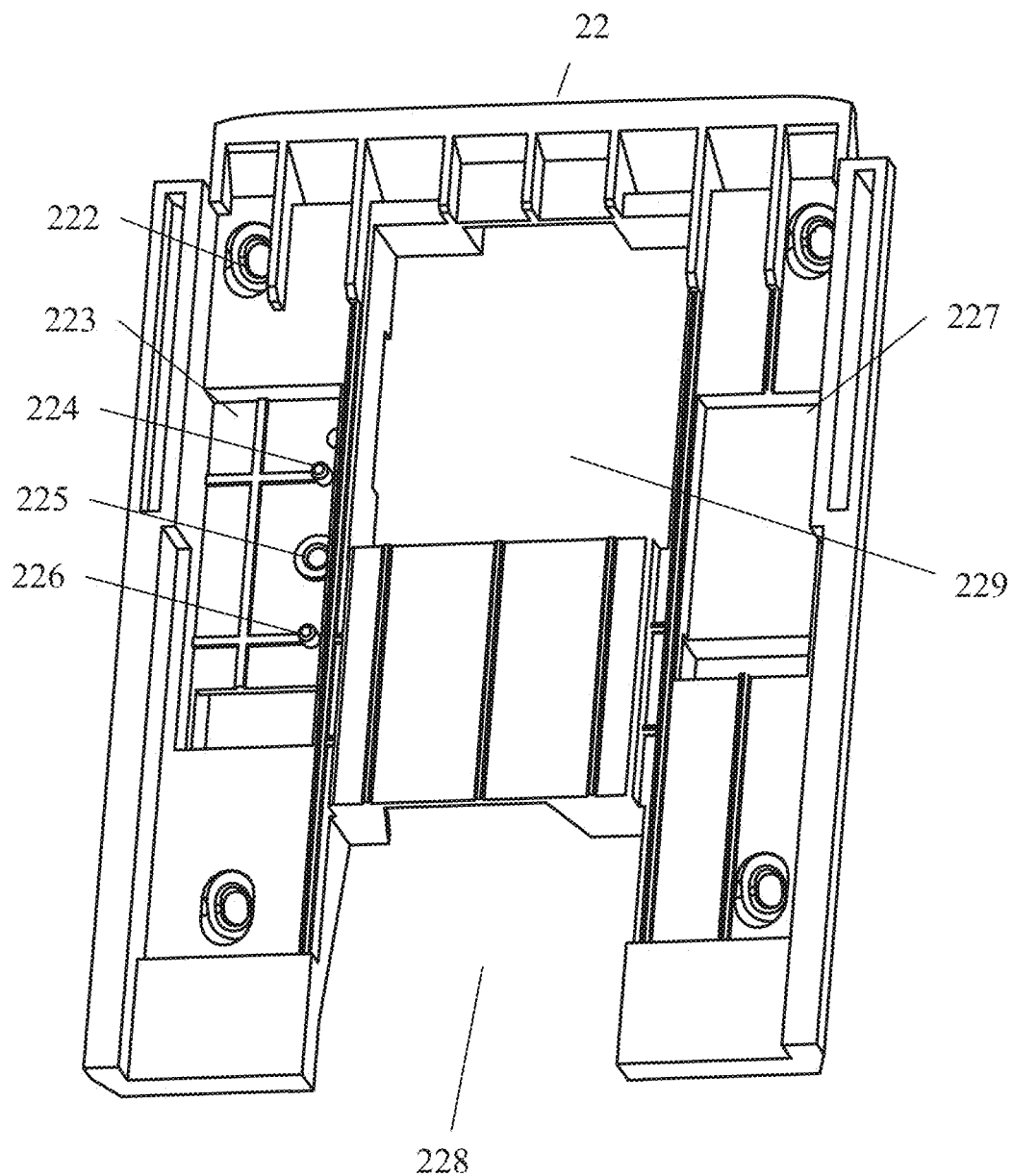
FIG. 12 is a side view of the second support member of the wireless charging device according to an embodiment of the present disclosure.
Figure 13:
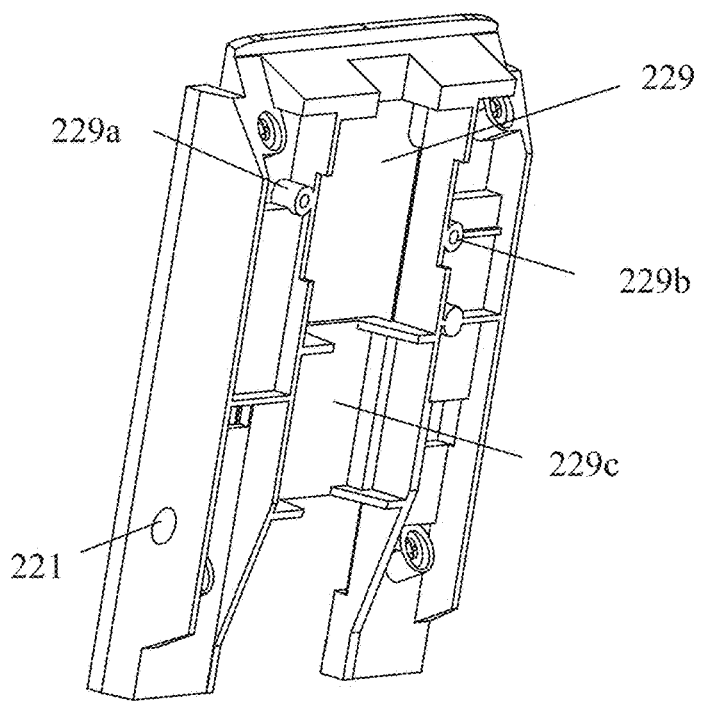
FIG. 13 is a side view of the second support member of the wireless charging device according to another embodiment of the present disclosure.
Figure 14:
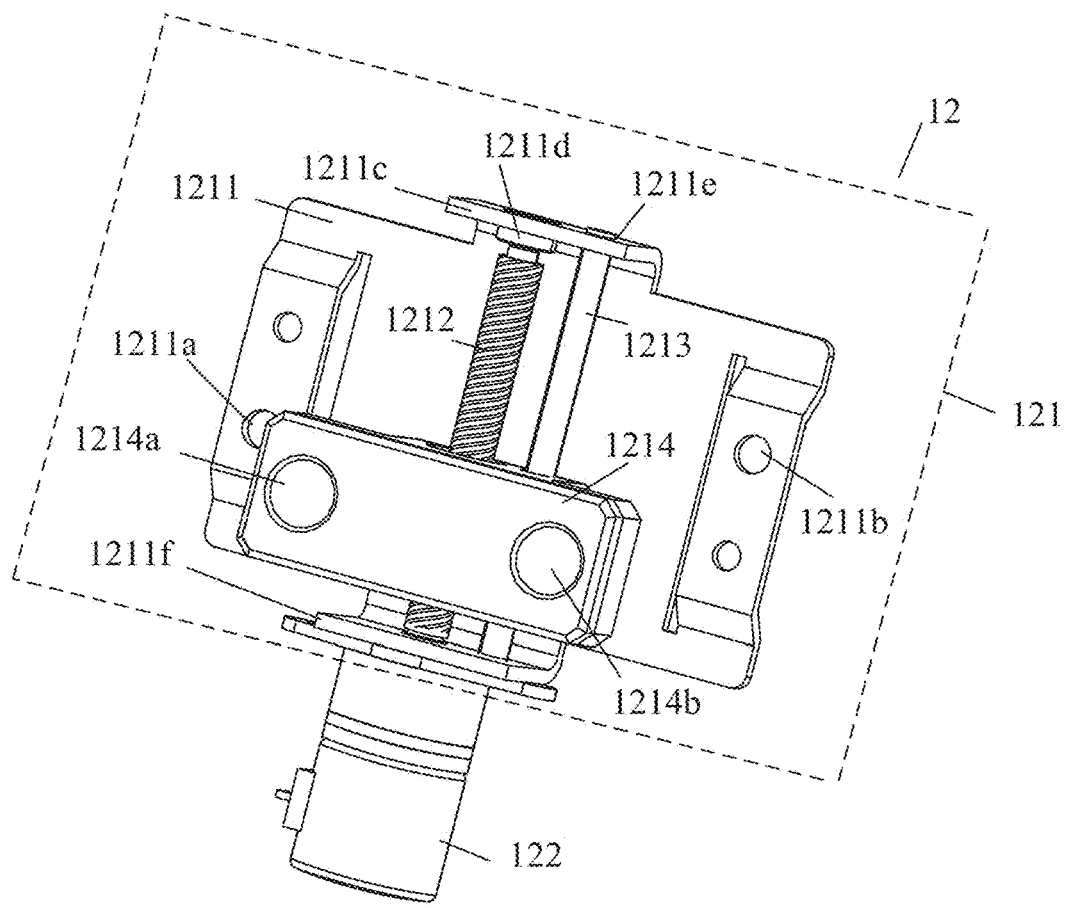
FIG. 14 is a side view of the motor module of the wireless charging device according to an embodiment of the present disclosure.

FIGS. 9 and 10 are side views of the fourth housing of the present disclosure embodiment. FIG. 11 is a side view of the sliding resistor of the present disclosure embodiment. FIGS. 12 and 13 are side views of the second support member of the present disclosure embodiment. FIG. 14 is a side view of the motor module of the present disclosure embodiment. As shown in FIGS. 9 to 14, the fourth housing 33 of the transmitting coil module 3 includes a first groove 332, a first connecting hole 333, a second connecting hole 334, a second groove 335, a third connecting hole 336, a second opening 338, and a third groove 339. It is understood that the fourth housing 33 of the transmitting coil module 3 has the first groove 332 and the second groove 335 on the side facing the first housing 15, and the third groove 339 on the side facing the second support member 22. Wherein, the third connecting hole 336 is located within the first groove 332.

In this embodiment, refer to FIGS. 6 and 9. The first transmitting coil 31, the second transmitting coil 32, the magnetic shielding plate 34, and the metal plate 35 may be fixed within the first groove 332.

In this embodiment, the flexible circuit board 23 may extend through the second opening 338 to the side of the metal plate 35 facing the fourth housing 33. That is, when the transmitting coil module 3 moves, the flexible circuit board 23 is movable within the second opening 338.

In this embodiment, the third connecting hole 336 is set within the second groove 335 of the fourth housing 33 of the transmitting coil module 3.

In this embodiment, the sliding resistor 1 includes a sliding rod 1a, a fourth connecting hole 1b, a fifth positioning hole 1c, and a fifth connecting hole 1d.

In this embodiment, the third connecting hole 336 of the fourth housing 33 of the transmitting coil module 3 is adapted to the sliding rod 1a, and the third connecting hole 336 is correspondingly set with the sliding rod 1a, allowing the sliding rod 1a to be fixed within the third connecting hole 336. Thereby, as the transmitting coil module 3 moves, it drives the sliding rod 1a to slide, giving the sliding resistor 1 electrical parameters that correspond to the position information of the transmitting coil module 3.

In this embodiment, the second support member 22 includes multiple fifth screw fixing holes 222, a fourth groove 223, a second positioning column 224, a sixth screw fixing hole 225, a third positioning column 226, a third opening 228, a third hollow part 229, a seventh screw fixing hole 229a, an eighth screw fixing hole 229b, and a fifth groove 229c. It is understood that the fourth groove 223 is set on the side of the second support member 22 facing the fourth housing 33 of the transmitting coil module 3, and the fifth groove 229c is set on the side facing the second housing 16.

Optionally, the second housing 16 may also include connecting holes corresponding to the fifth screw fixing holes 222. Therefore, the second support member 22 and the second housing 16 may be fixed with screws.

In this embodiment, the sliding resistor 1 may be fixed within the fourth groove 223 of the second support member 22. Optionally, the second positioning column 224 of the second support member 22 corresponds to and is adapted to the fourth connecting hole 1b of the sliding resistor 1, allowing the second positioning column 224 to be fixed to the fourth connecting hole 1b. At the same time, the sixth screw fixing hole 225 of the second support member 22 corresponds to and is adapted to the fifth positioning hole 1c of the sliding resistor 1, so the sliding resistor 1 may be fixed to the fourth groove 223 with screws. Also, the third positioning column 226 of the second support member 22 corresponds to and is adapted to the fifth connecting hole 1d of the sliding resistor 1, allowing the third positioning column 226 to be fixed to the fifth connecting hole 1d.

In this embodiment, the flexible circuit board 23 may pass through the third opening 228 of the second support member 22 and the second opening 338 of the fourth housing 33 of the transmitting coil module 3 to extend to the side of the metal plate 35 facing the fourth housing 33.

In this embodiment, the motor module 12 includes a transmission mechanism 121 and a motor 122. The transmission mechanism 121 includes a fixed plate 1211, a screw rod 1212, a guiding rod 1213, and a slider 1214. The fixed plate 1211 includes a sixth positioning hole 1211a, a seventh positioning hole 1211b, a fifth protruding part 1211c, a nut 1211d, a guide hole 1211e, and a sixth protruding part 1211f. The slider 1214 includes a sixth connecting hole 1214a and a seventh connecting hole 1214b.

In this embodiment, the motor 122 is connected to the screw rod 1212. The slider 1214 is connected to the screw rod 1212 and the guiding rod 1213. Optionally, the slider 1214 includes a first through hole and a second through hole. The first through hole is designed to allow the guiding rod 1213 to pass through, and the diameter of the first through hole matches the diameter of the guiding rod 1213. The second through hole is designed to allow the screw rod 1212 to pass through, and the diameter of the second through hole matches the diameter of the screw rod 1212, allowing the screw rod 1212 to pass tightly through the second through hole, thereby enabling the slider 1214 to move upward or downward along the threads of the screw rod 1212 when the screw rod 1212 rotates. Thereby, when the motor 122 drives the screw rod 1212 to rotate, the screw rod 1212 may drive the slider 1214 to move.

In this embodiment, the fixed plate 1211 is used to fix the screw rod 1212 and the guiding rod 1213. Optionally, the nut 1211d is fixed to the fifth protruding part 1211c and is connected to the screw rod 1212. At the same time, the guide hole 1211e is fixed to the fifth protruding part 1211c and is adapted to the guiding rod 1213, allowing the guiding rod 1213 to be fixed in the guide hole 1211e. At the same time, the fixed plate 1211 is connected to the motor 122 through the sixth protruding part 1211f. For example, the motor 122 may be fixed to the sixth protruding part 1211f through screws, bolts, etc.

In this embodiment, the transmission mechanism 121 of the motor module 12 may be set in the third hollow part 229 of the second support member 22. Optionally, the sixth positioning hole 1211a of the motor module 12 is correspondingly set with the eighth screw fixing hole 229b of the second support member 22, and the sixth positioning hole 1211a is adapted to the eighth screw fixing hole 229b, so the sixth positioning hole 1211a and the eighth screw fixing hole 229b may be fixed through screws. Similarly, the seventh positioning hole 1211b of the motor module 12 is correspondingly set with the seventh screw fixing hole 229a of the second support member 22, and the seventh positioning hole 1211b is adapted to the seventh screw fixing hole 229a, so the seventh positioning hole 1211b and the seventh screw fixing hole 229a may be fixed through screws. Thereby, the transmission mechanism 121 of the motor module 12 may be set in the third hollow part 229 of the second support member 22. Correspondingly, the motor 122 of the motor module 12 may be set in the fifth groove 229c of the second support member 22.

Furthermore, the slider 1214 of the motor module 12 may pass through the third hollow part 229 of the second support member 22 and connect with the third groove 339 of the fourth housing 33 of the transmitting coil module 3. Optionally, the first connecting hole 333 and the second connecting hole 334 of the fourth housing 33 are set in the third groove 339. The sixth positioning hole 1211a of the slider 1214 is correspondingly set with the first connecting hole 333 of the fourth housing 33, and the sixth positioning hole 1211a is adapted to the first connecting hole 333. At the same time, the seventh positioning hole 1211b of the slider 1214 is correspondingly set with the second connecting hole 334 of the fourth housing 33, and the seventh positioning hole 1211b is adapted to the second connecting hole 334. At the same time, the third groove 339 is adapted in size to the slider 1214, so the slider 1214 may be fixed in the third groove 339 through screws or bolts.

Furthermore, since the motor 122 of the motor module 12 drives the screw rod 1212 to rotate, the screw rod 1212 may drive the slider 1214 to move, and the slider 1214 passes through the third hollow part 229 of the second support member 22 and is connected to the third groove 339 of the fourth housing 33 of the transmitting coil module 3, the slider 1214 may drive the transmitting coil module 3 to move when it moves. It is understood that the hollow range of the third hollow part 229 of the second support member 22 needs to be greater than the moving range of the slider 1214, allowing the slider 1214 to move in the third hollow part 229 and drive the transmitting coil module 3 to move. Optionally, the motor module 12 and the sliding resistor 1 are set in the side view of the second support member 22, which may refer to FIG. 15.

Figure 15:
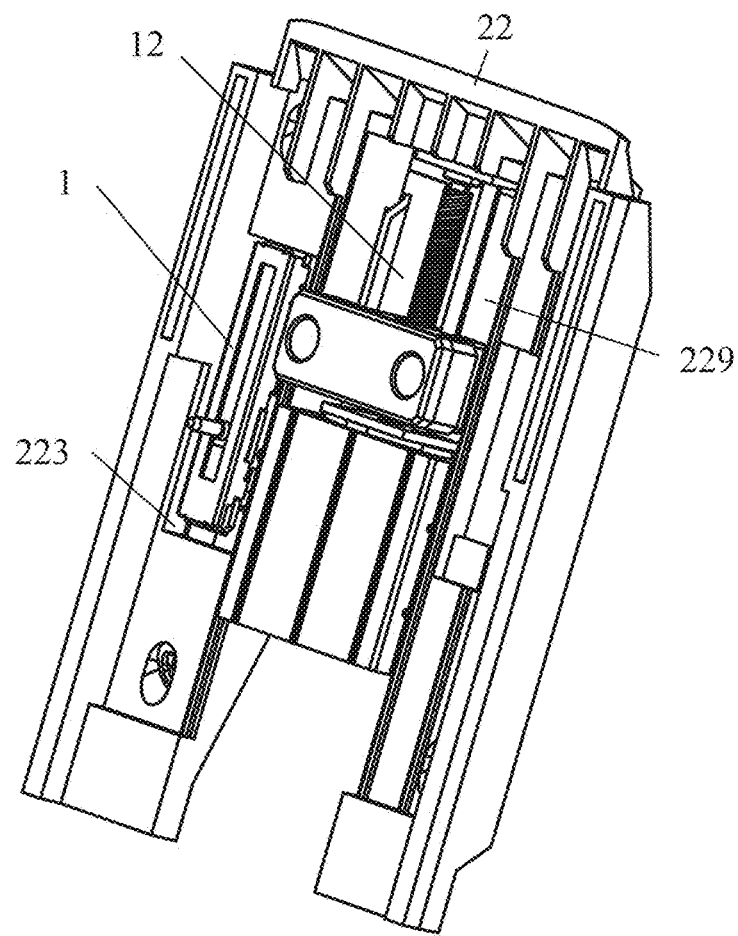
FIG. 15 is a side view of the motor module and sliding resistor mounted on the second support member of the wireless charging device according to an embodiment of the present disclosure.

FIG. 15 is a side view of the motor module and sliding resistor set in the second support member according to this embodiment. As shown in FIG. 15, the sliding resistor 1 is set in the fourth groove 223 of the second support member 22. The transmission mechanism 121 of the motor module 12 is set in the third hollow part 229. The slider 1214 of the transmission mechanism 121 passes through the third hollow part 229 and is connected to the fourth housing 33 of the transmitting coil module 3.

In this embodiment, an example that the wireless charging device includes one sliding resistor is used for illustration. It should be understood that the wireless charging device of this embodiment may also include multiple sliding resistors. For example, the wireless charging device includes a first sliding resistor (i.e., sliding resistor 1) and a second sliding resistor. At this time, the fourth housing 33 of the transmitting coil module 3 also includes a sixth groove 337, and the second support member 22 also includes a seventh groove 227. Similar to the structure and setting method of the sliding resistor 1, the second sliding resistor may be set in the seventh groove 227 of the second support member 22, and the sliding rod of the second sliding resistor may be connected to the connecting hole in the sixth groove 337 of the fourth housing 33. When the transmitting coil module 3 moves, the fourth housing 33 may drive the sliding rods of the first sliding resistor and second sliding resistor to slide at the same time, enabling the first sliding resistor and second sliding resistor to have electrical parameters corresponding to the position information of the transmitting coil module 3. Then, the control chip 2b may more accurately determine the position information of the transmitting coil module 3 by detecting the electrical parameters of the first and second sliding resistors.

In this embodiment, the controller 2 determines the current position information of the transmitting coil module 3 according to the current electrical parameters detected by the sliding resistor 1, and determines the position information of the receiving coil based on the position signal obtained by the first transmitting coil 31 or the second transmitting coil 32 of the transmitting coil module 3. Then, the controller 2 controls the transmitting coil module 3 to move based on the position information of the receiving coil and the current position information of the transmitting coil module 3, enabling the transmitting coil module 3 to position and charge wirelessly with the receiving coil. Wherein, the controller 2 may control the driving circuit 11 to output a driving signal to be transmitted to the motor 122, enabling the motor 122 to drive the transmission mechanism 121 to move the transmitting coil module 3 to a height corresponding to the driving signal. It is understood that the driving signal has a corresponding relationship with the height to which the transmitting coil module 3 moves.

In this embodiment, multiple driving signals may be controlled to output in advance, and the height corresponding to each driving signal may be recorded. Thereby, the corresponding relationship between the driving signal and the height to which the transmitting coil module 3 moves may be determined. For example, when the voltage represented by the driving signal is $c_1 V$, the transmitting coil module 3 moves to a height a1. When the voltage represented by the driving signal is $c_2 V$, the transmitting coil module 3 moves to a height a2.

In this embodiment, the working states of the wireless charging device include a shutdown state, a powered-on state, and a power-off state. The powered-on state includes a powered-on non-charging state and a powered-on charging state. The power-off state includes a power-off retracted state and a power-off extended state. Wherein, the shutdown state represents that the power supply interface 14 does not receive the DC signal provided by the external charging line, and all circuits in the wireless charging device are de-energized. The powered-on non-charging state represents that the power supply interface 14 receives the DC signal provided by the external charging line, and the wireless charging device does not charge the device to be charged. The powered-on charging state represents that the power supply interface 14 receives the DC signal provided by the external charging line, and the wireless charging device charges the device to be charged. The power-off extended state represents that the power supply interface 14 does not receive the DC signal provided by the external charging line, and the transmitting coil module of the wireless charging device is in an extended state. The power-off retracted state represents that the power supply interface 14 does not receive the DC signal provided by the external charging line, and the transmitting coil module of the wireless charging device is in a retracted state.

In this embodiment, when the wireless charging device is in a shutdown state, the transmitting coil module 3 is in a retracted state, which may refer to FIG. 4. At this time, the transmitting coil module 3 retracts within the wireless charging device, and the transmitting coil module 3 has a first height. Thereby, the wireless charging device is convenient for carrying and storage. Furthermore, when a DC signal is detected by the control chip 2b and the intensity of the optical signal detected by the optical sensor 13 is greater than or equal to the threshold value, the wireless charging device is controlled to switch from a shutdown state to a powered-on non-charging state.

Optionally, the main control chip 2a or the control chip 2b detects that the buck circuit 46 outputs a charging signal, representing that the power supply interface 14 transmits the DC signal provided by the external charging line to the power supply circuit 4, and the main control chip 2a or the control chip 2b controls the wireless charging device to switch from a shutdown state to a powered-on non-charging state, enabling all circuits in the wireless charging device to be energized.

Optionally, the main control chip 2a or the control chip 2b is connected to the voltage regulator circuit 41 through a signal detection circuit. Then, the main control chip 2a or the control chip 2b detects the DC signal transmitted by the power supply interface 14 through the signal detection circuit, and controls the wireless charging device to switch from a shutdown state to a powered-on non-charging state. In the following description, the example of the control chip 2b detecting the DC signal is used for illustration.

Optionally, for the powered-on non-charging state, the switching circuits 31a and 32a are in a conductive state.

In this embodiment, for the powered-on non-charging state, that is, when a DC signal is detected by the control chip 2b, the control chip 2b sends a first control signal to the driving chip of the driving circuit 11, enabling the driving chip to output a first driving signal corresponding to the resistor, thereby enabling the motor 122 to drive the transmission mechanism 121 to move the transmitting coil module 3 from the first height upwardly to the second height. It is understood that the first control signal corresponds to the first driving signal. Wherein the second height is greater than the first height. In the following description, the example of the control signals sent by the control chip 2b to the driving chip being different PWM signals is used for illustration. Furthermore, when a DC signal is detected by the control chip 2b and the intensity of the optical signal detected by the optical sensor 13 is less than the threshold value, it indicates that the device to be charged is placed on the wireless charging device, and the control chip 2b controls the wireless charging device to switch from a powered-on non-charging state to a powered-on charging state.

In this embodiment, for the powered-on charging state, that is, when a DC signal is detected by the control chip 2b and the intensity of the optical signal detected by the optical sensor 13 is less than the threshold value, the controller 2 determines the position information of the receiving coil based on the position signal obtained by the first transmitting coil 31 or the second transmitting coil 32 of the transmitting coil module 3, and determines the current position information of the transmitting coil module 3 according to the current electrical parameters of the sliding resistor 1, and then sends a second control signal to the driving chip of the driving circuit 11 to control the driving chip to output a corresponding second driving signal through the resistor, thereby enabling the motor 122 to drive the transmission mechanism 121 to move the transmitting coil module 3 from the second height downwardly to the third height, thereby enabling the transmitting coil module 3 to position and charge wirelessly with the receiving coil. Wherein the second height is greater than the third height, and the third height is greater than or equal to the first height. The first transmitting coil 31 or the second transmitting coil 32 may transmit the position signal of the receiving coil to the main control chip 2a, and the main control chip 2a may transmit the position signal of the receiving coil, or the position information of the receiving coil to the control chip 2b through I2C communication, and then the control chip 2b sends a second control signal to the driving chip of the driving circuit 11 according to current position information of the transmitting coil module 3 determined by the current electrical parameters of the sliding resistor 1 and the position information of the receiving coil.

In an optional implementation, the position signal obtained by the transmitting coil module 3 represents the position information of the receiving coil, and the main control chip 2a or the control chip 2b (hereinafter referred to as the controller 2) may parse the position signal to determine the position information of the receiving coil. For example, if the device to be charged is a custom mobile phone for the wireless charging device, the first transmitting coil 31 or the second transmitting coil 32 (hereinafter referred to as the transmitting coil module 3) may send electromagnetic signals to the receiving coil of the custom mobile phone to determine the position of the receiving coil, and then the transmitting coil module 3 may transmit the electrical signal (that is, the position signal) feedback from the custom mobile phone's receiving coil to the controller 2. This electrical signal carries the position data of the receiving coil (for example, the intensity, frequency, and amplitude of this electrical signal represent the position of the receiving coil). Therefore, the controller 2 may directly determine the position information of the receiving coil by parsing this electrical signal.

In another optional implementation, the position signal obtained by the transmitting coil module 3 represents the electrical parameters of the receiving coil, and the controller 2 may calculate the position information of the receiving coil according to the electrical parameters of the first transmitting coil 31 or the second transmitting coil 32 and the electrical parameters of the receiving coil. For example, if the device to be charged is a non-custom mobile phone for the wireless charging device, the transmitting coil module 3 may send electromagnetic signals to the receiving coil to determine the position of the receiving coil, and then the transmitting coil module 3 may transmit the electrical signal (that is, the position signal) feedback from the non-custom mobile phone's receiving coil to the controller 2. This electrical signal carries the electrical parameters of the receiving coil (for example, the intensity, frequency, and amplitude of this electrical signal represent the power, current, voltage, etc., of the receiving coil). Then, the controller 2 may calculate the position information of the receiving coil according to the power, current, voltage, etc., of the first transmitting coil 31 or the second transmitting coil 32 and the electrical parameters of the receiving coil.

In this embodiment, for the powered-on charging state, the main control chip 2a in the controller 2 may detect the electrical parameters of the first transmitting coil 31 and the second transmitting coil 32. When the electrical parameters of the first transmitting coil 31 or the second transmitting coil 32 meet the working parameters (for example, the power, current, voltage, etc., of the first transmitting coil 31 or the second transmitting coil 32 meet the predetermined power value, predetermined current value, predetermined voltage value, etc.), the control chip 2b may control the transmitting coil module 3 to move, enabling the first transmitting coil 31 or the second transmitting coil 32 to position and charge wirelessly with the receiving coil. That is, considering that users may place the device to be charged on the wireless charging device in different ways, resulting in different positions of the receiving coil of the device to be charged. For example, users may place the device to be charged upright on the wireless charging device, users may also place the device to be charged horizontally on the wireless charging device, and users may also place the device to be charged diagonally on the wireless charging device. In response to this situation, this embodiment moves the transmitting coil module 3 to position with the receiving coil during the positioning process. If the electrical parameters of the first transmitting coil 31 or the second transmitting coil 32 meet the working parameters, the control chip 2b may, in real-time, according to the position information of the receiving coil and the current position information of the transmitting coil module 3, control the drive circuit 11 to adjust the voltage value or the current value or the like characterized by the output second drive signal, enabling the first transmitting coil 31 or the second transmitting coil 32 to position and charge with the receiving coil. Thereby, the wireless charging device has high applicability.

Optionally, after the main control chip 2a detects that the electrical parameters of one transmitting coil meet the working parameters, the main control chip 2a may control the switching circuit corresponding to the other transmitting coil to switch from a conductive state to a disconnected state. For example, after the main control chip 2a detects that the electrical parameters of the first transmitting coil 31 meet the working parameters, the main control chip 2a may control the switching circuit 32a corresponding to the second transmitting coil 32 to switch from a conductive state to a disconnected state. Thereby, energy is saved.

In this embodiment, the control chip 2b may control the driving circuit 11 to adjust the voltage value or current value, etc., characterized by the output of the second drive signal by using positioning algorithms, so that the transmitter coil module 3 (i.e., the first transmitter coil 31 or the second transmitter coil 32) is accurately position with the receiver coil. The positioning algorithms include the PID algorithm (Proportional Integral Differential). Optionally, the PID algorithm enables the control chip 2b to dynamically adjust the pulse width characterized by the output PWM signal (i.e., the second control signal) in real-time according to the position information of the receiving coil and the current position information of the transmitting coil module 3, through proportional control sub-algorithms, integral control sub-algorithms, and differential control sub-algorithms, thereby enabling the control chip 2b to dynamically adjust the voltage value or current value represented by the output of the second driving signal, enabling the transmitting coil module 3 to accurately position with the receiving coil.

Optionally, the positioning algorithm also includes neural network algorithms, model predictive control (MPC), and other algorithms.

Optionally, if the control chip 2b detects a discharge signal from the backup power source 10 and the intensity of the optical signal detected by the optical sensor 13 is transformed from less than the threshold value to greater than or equal to the threshold value indicating that the device to be charged is not placed on the wireless charging device (for example, the user removes the device to be charged from the wireless charging device and maintains the power supply interface 14 connected to the external charging line, etc.), the control chip 2b controls the wireless charging device to switch from a powered-on charging state to a powered-on non-charging state.

Optionally, for switching from a powered-on charging state to a powered-on non-charging state, that is, when the control chip 2b detects a DC signal and the intensity of the optical signal is greater than or equal to the threshold value, the control chip 2b sends a third control signal to the driving chip in the driving circuit 11, enabling the driving chip to output a corresponding third driving signal through the resistor, thereby enabling the motor 122 to drive the transmission mechanism 121 to move the transmitting coil module 3 from the third height upwardly to the second height.

Furthermore, if the device to be charged is placed on the wireless charging device again, that is, when the control chip 2b detects a DC signal and the intensity of the optical signal changes from greater than or equal to the threshold value to less than the threshold value, then the control chip 2b controls the wireless charging device to switch from a powered-on non-charging state to a powered-on charging state.

In this embodiment, if the control chip 2b detects a discharge signal from the backup power source 10 and the intensity of the optical signal is less than the threshold value, indicating that the power supply interface 14 has not received the DC signal provided by the external charging line, and the device to be charged is still placed on the wireless charging device. Then the control chip 2b controls the wireless charging device to switch from a powered-on charging state to a power-off extended state.

In this embodiment, for the transition from the powered charging state to the power-off extended state, the backup power source 10 supplies power to the driving circuit 11, and at the same time, the backup power source 10 supplies power to the indicator light 9, optical sensor 13, sliding resistor 1, etc., through the voltage regulator 8, while the transmitting coil module 3 maintains the same height as in the powered-on charging state. For example, when the wireless charging device is in the powered-on charging state, the transmitting coil module 3 has the third height, after switching from the powered-on charging state to the power-off extended state, the transmitting coil module 3 has the third height.

Furthermore, if the control chip 2b detects a discharge signal from the backup power source 10, and the intensity of the optical signal changes from being less than the threshold to being greater than or equal to the threshold, indicating that the charging device is not placed on the wireless charging device at this time (for example, when the user removes the charging device from the wireless charging device), then the control chip 2b controls the wireless charging device to switch from the power-off extended state to the power-off retracted state.

In this embodiment, for the power-off retracted state, that is, when the control chip 2b detects a discharge signal from the backup power source 10 and the intensity of the optical signal is greater than or equal to the threshold value, the control chip 2b sends a fourth control signal to the driving chip of the driving circuit 11 according to the current position of the transmitting coil module 3 determined by the current electrical parameters of the sliding resistor 1 and the first height when the transmitting coil module 3 is in a retracted state, controlling the driving chip to output a corresponding fourth driving signal through the resistor, thereby enabling the motor 122 to drive the transmission mechanism 121 to move the transmitting coil module 3 from the third height to the first height. Furthermore, after the transmitting coil module 3 moves to the first height, the controller 2 controls the various circuits in the wireless charging device to be de-energized, that is, the wireless charging device switches from a power-off retracted state to a shutdown state.

Optionally, the control chip 2b may control the wireless charging device to switch from the powered-on uncharged state to the power-off retracted state. For example, in the powered-on uncharged state, when the user disconnects the external charging cable and the power supply interface 14, the control chip 2b may control the driving circuit 11 to output a fifth driving signal, enabling the motor 122 to drive the transmission mechanism 121 to move the transmitting coil module 3 from the second height to the first height. Then the controller 2 controls the power down of various circuits in the wireless charging device, thereby switching the wireless charging device from the power-off retracted state to the shutdown state.

In this embodiment, the working states of the wireless charging device, including shutdown state, powered-on state, and power-off state, are used for illustration. It should be understood that the working states of the wireless charging device in this embodiment may be customized according to user needs. For example, after the wireless charging device is powered on and the transmitting coil module 3 remains in the retracted state, and then the user places the device to be charged on the wireless charging device, the controller 2 controls the transmitting coil module to move according to the position information of the receiving coil and the current position information of the transmitting coil module 3, enabling the transmitting coil module 3 to position and charge wirelessly with the receiving coil.

In this embodiment, if the controller 2 receives a power signal sent by the device to be charged, the controller 2 controls the transmitting coil module 3 to charge the receiving coil wirelessly using a power corresponding to the power signal. Optionally, the main control chip 2a in the controller 2 may, according to the power value characterized by the power signal, drive the high-frequency switching elements in the inverter circuit 45 to be in a switching state at a frequency corresponding to the power value characterized by the power signal, that is, continuously switching the connection and disconnection of the circuit, enabling the transmitting coil module 3 to output a power signal corresponding to the power value for wireless charging of the receiving coil.

Optionally, the device to be charged is an electronic device with functions such as data transmission, data processing, and human-machine interaction, allowing the user to send the aforementioned power signal to the wireless charging device through an application on the device to be charged. The application is associated with the wireless charging device of this embodiment. It is easy to understand that the user may also send fan speed signals and indicator light control signals to the controller 2 through the application on the device to be charged. The controller 2 may then control the heat dissipator 5 to dissipate heat according to the fan speed signal, with the control chip 2b controlling the heat dissipator 5 according to the fan speed indicated by the fan speed signal. The control chip 2b also controls the indicator light 9 to display according to the lighting mode indicated by the indicator light control signal.

Figure 16:
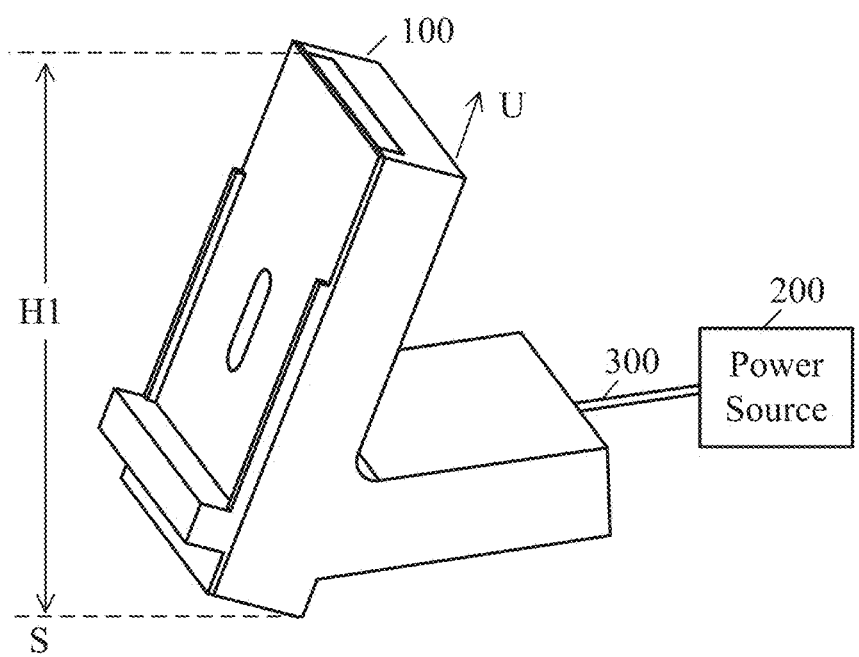
FIG. 16 is a schematic diagram of the wireless charging device connected to an external power source according to an embodiment of the present disclosure.
Figure 17:
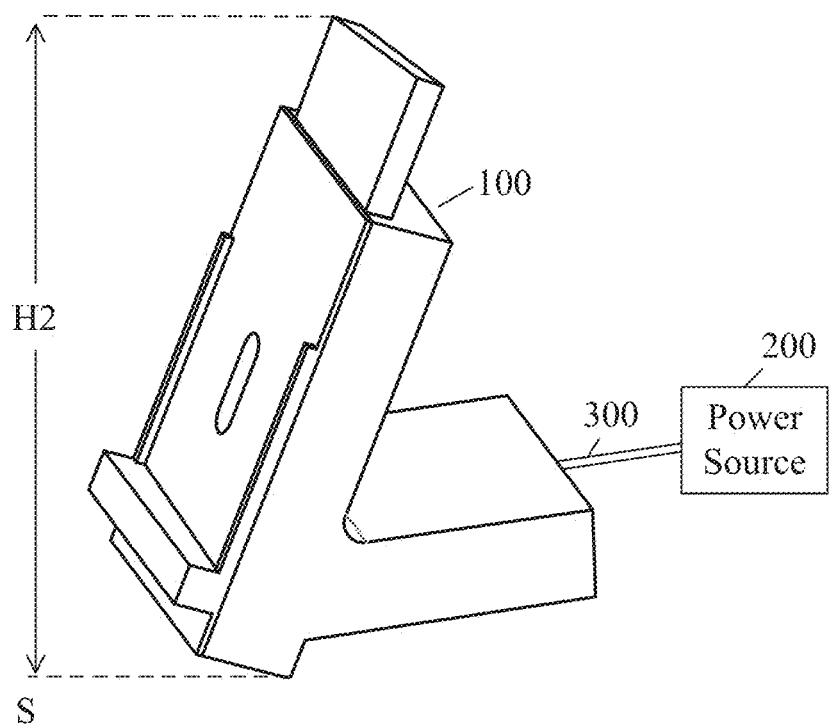
FIG. 17 is a schematic diagram of the transmitting coil module moving to the second height of the wireless charging device according to an embodiment of the present disclosure.
Figure 18:
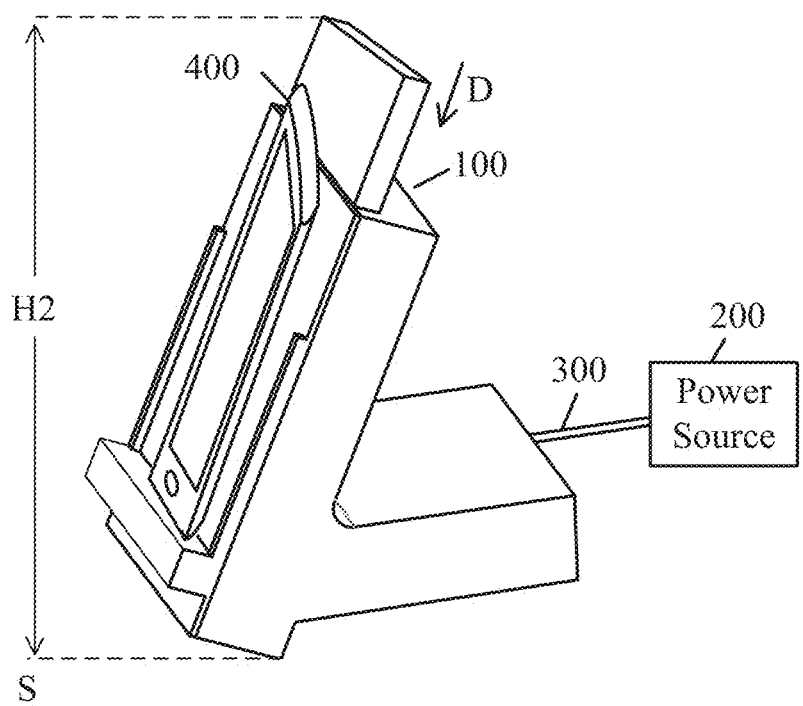
FIG. 18 is a schematic diagram of the device to be charged placed upright on the wireless charging device according to an embodiment of the present disclosure.
Figure 19:
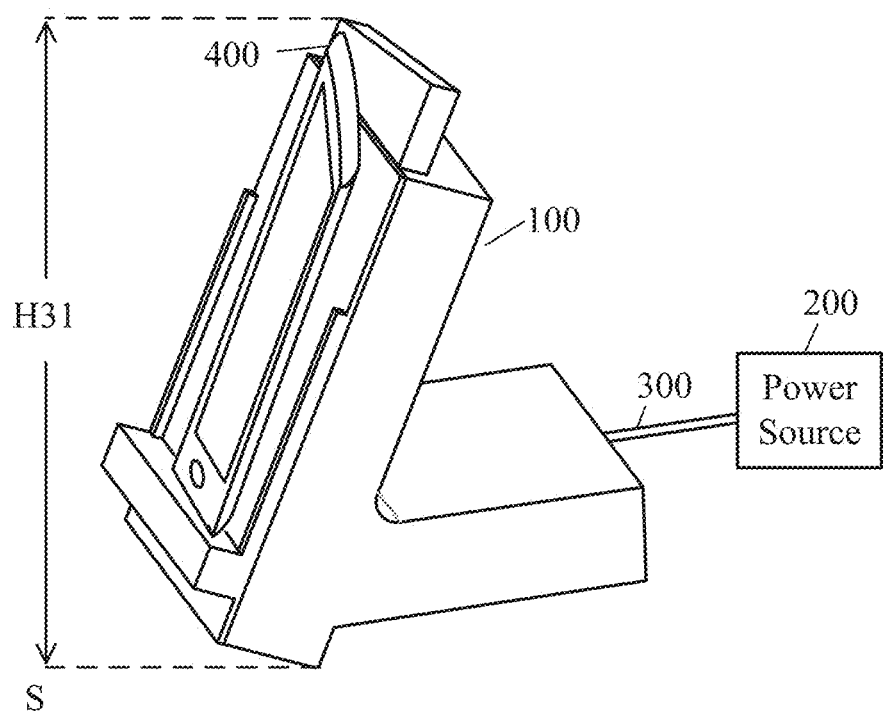
FIG. 19 is a schematic diagram of the transmitting coil module moving to the third height of the wireless charging device according to an embodiment of the present disclosure.
Figure 20:
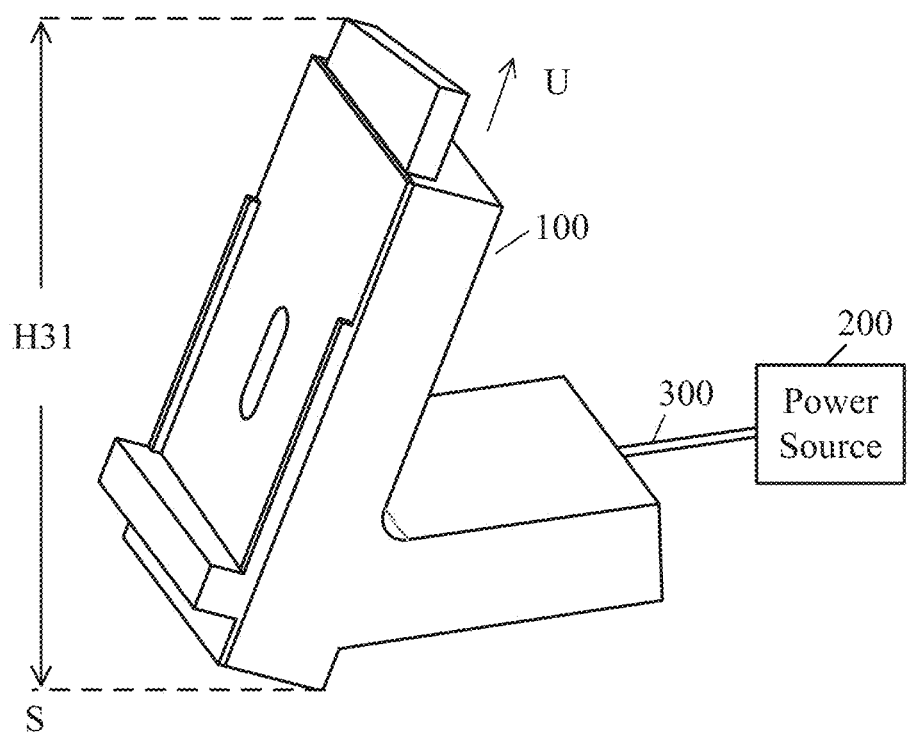
FIG. 20 is a schematic diagram after the device to be charged is removed from the wireless charging device according to an embodiment of the present disclosure.
Figure 21:
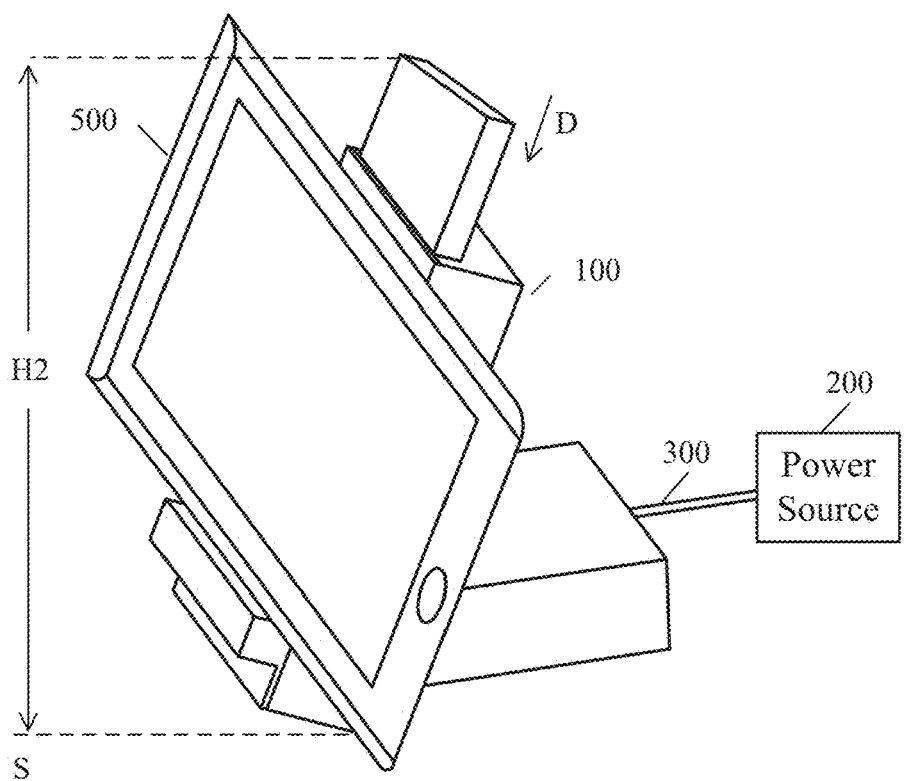
FIG. 21 is a schematic diagram of the device to be charged placed horizontally on the wireless charging device according to an embodiment of the present disclosure.
Figure 22:
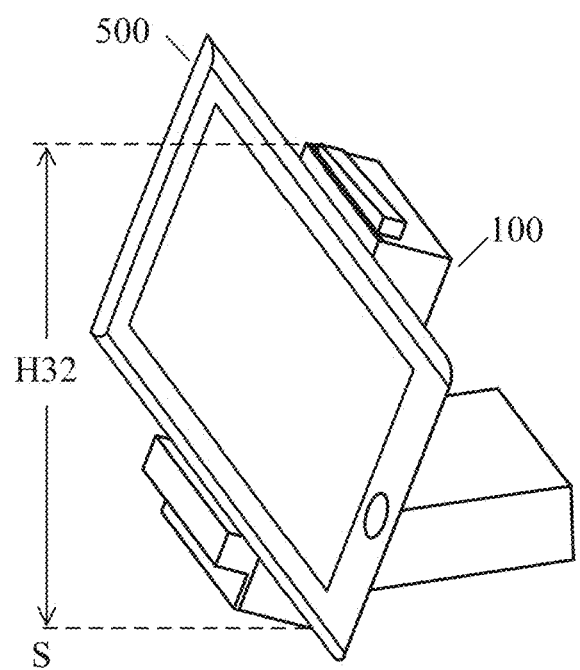
FIG. 22 is a schematic diagram of the transmitting coil module moving to the third height of the wireless charging device according to another embodiment of the present disclosure.
Figure 23:
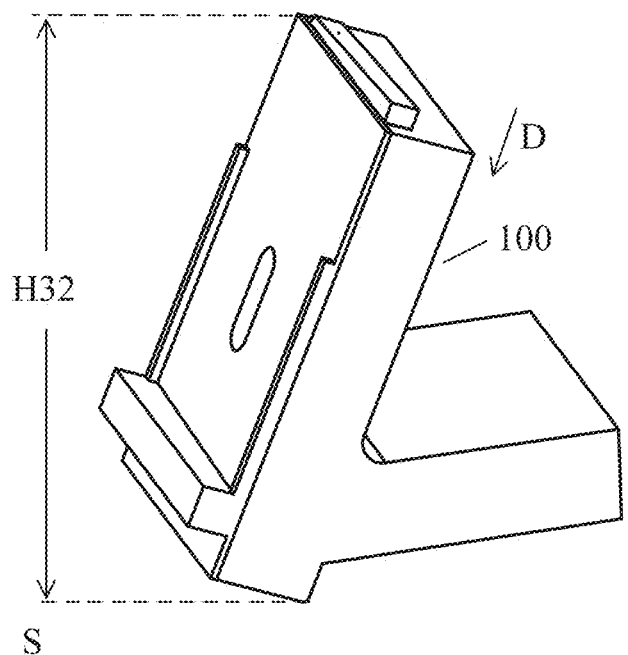
FIG. 23 is a schematic diagram after the device to be charged is removed from the wireless charging device according to another embodiment of the present disclosure.

For example, refer to FIGS. 16-23. FIG. 16 is a schematic diagram of the wireless charging device of this embodiment connected to an external power source. FIG. 17 is a schematic diagram of the transmitting coil module moving to the second height in this embodiment. FIG. 18 is a schematic diagram of the device to be charged being placed upright on the wireless charging device in this embodiment. FIG. 19 is a schematic diagram of the transmitting coil module moving to the third height in this embodiment. FIG. 20 is a schematic diagram after the device to be charged is removed from the wireless charging device in this embodiment. FIG. 21 is a schematic diagram of the device to be charged being placed horizontally on the wireless charging device in this embodiment. FIG. 22 is a schematic diagram of the transmitting coil module moving to the third height in this embodiment. FIG. 23 is a schematic diagram after the device to be charged is removed from the wireless charging device in this embodiment. In the following description, the position information of the transmitting coil module 3 is exemplified by representing the height between the top of the fourth housing 33 and the bottom of the third housing 17 on the horizontal plane S.

Refer first to FIGS. 4 and 16. In FIG. 4, the wireless charging device is in a shutdown state without being connected to an external power source, and the transmitting coil module 3 is in a retracted state. Then refer to FIG. 16, at this time, the wireless charging device 100 is connected to an external power source 200 through a charging cable 300, the controller 2 detects a direct current (DC) signal, controls each circuit in the wireless charging device 100 to be powered on, and controls the driving circuit 11 to output a first driving signal, enabling the motor 122 to drive the transmission mechanism 121 to move the transmitting coil module 3 in direction U from the first height H1 to the second height H2 shown in FIG. 17, to achieve the wireless charging device 100 switching from a shutdown state to a powered-on uncharged state. The first height H1, for example, is 103.9 mm. The second height H2, for example, is 117.2 mm.

Furthermore, in FIG. 18, when the user places the device to be charged 400 upright on the wireless charging device 100, and since the device to be charged 400 blocks the light guide plate 18, the controller 2 detects that the intensity of the optical signal is less than the threshold value, and detects that the electrical parameters of the first transmitting coil 31 meet the working parameters, the controller 2 controls the driving circuit 11 to output a second driving signal (this second driving signal represents the first voltage value) based on the position information of the receiving coil of the device to be charged 400 and the current position information of the transmitting coil module 3 (that is, the second height H2), enabling the motor 122 to drive the transmission mechanism 121 to move the transmitting coil module 3 in direction D from the second height H2 to the third height H31 shown in FIG. 19, thereby enabling the first transmitting coil 31 of the transmitting coil module 3 to accurately position and charge wirelessly with the receiving coil of the device to be charged 400, achieving the wireless charging device 100 switching from a powered-on uncharged state to a powered-on charging state. The third height H31, for example, is 111.1 mm. Direction D is opposite to direction U.

Furthermore, in FIG. 20, when the user removes the device to be charged 400 from the wireless charging device 100, the controller 2 detects that the intensity of the optical signal is greater than the threshold value and controls the driving circuit 11 to output a third driving signal, enabling the motor 122 to drive the transmission mechanism 121 to move the transmitting coil module 3 in direction U from the third height H31 to the second height H2 shown in FIG. 17, to achieve the wireless charging device 100 switching from a powered-on charging state to a powered-on uncharged state.

Then refer to FIG. 21, when the user places the device to be charged 500 horizontally on the wireless charging device 100, the controller 2 detects that the intensity of the optical signal is less than the threshold value and detects that the electrical parameters of the second transmitting coil 32 meet the working parameters, the controller 2 controls the driving circuit 11 to output a second driving signal (this second driving signal represents the second voltage value) according to the position information of the receiving coil of the device to be charged 500 and the current position information of the transmitting coil module 3 (that is, the second height H2), enabling the motor 122 to drive the transmission mechanism 121 to move the transmitting coil module 3 in direction D from the second height H2 to the third height H32 shown in FIG. 22, thereby enabling the second transmitting coil 32 of the transmitting coil module 3 to accurately position and charge wirelessly with the receiving coil of the device to be charged 500, achieving the wireless charging device 100 switching from a powered-on uncharged state to a powered-on charging state. The third height H32, for example, is 105 mm. The devices to be charged 400 and 500 are, for example, electronic devices of different types/models.

Furthermore, continuing to refer to FIG. 22, during the process of the wireless charging device 100 charging the device to be charged 500, if the user controls the wireless charging device 100 to be disconnected from the charging cable 300, at this time, the controller 2 detects a discharge signal from the backup power source 10 and the intensity of the optical signal is less than the threshold value, then the backup power source 10 supplies power to the driving circuit 11, voltage regulator 8, and other circuits of the wireless charging device 100, while the transmitting coil module 3 maintains the third height H32, to achieve the switch from the powered-on charging state to the power-off extended state.

Then refer to FIG. 23 and FIG. 4. In FIG. 23, when the user removes the device to be charged 500 from the wireless charging device 100, the controller 2 detects a discharge signal from the backup power source 10 and the intensity of the optical signal is greater than the threshold value, and controls the driving circuit 11 to output a fourth driving signal, enabling the motor 122 to drive the transmission mechanism 121 to move the transmitting coil module 3 in direction D from the third height H32 to the first height shown in FIG. 4, to achieve the wireless charging device 100 switching from a power-off extended state to a power-off retracted state. Thereby, the controller 2 controls each circuit in the wireless charging device 100 to power down, that is, the wireless charging device 100 switches from a power-off retracted state to a shutdown state. Thus, the charging process is completed.

The present disclosure, by movably setting the transmitting coil module within the wireless charging device, obtaining the position signal of the receiving coil to transmit to the controller, and connecting the sliding rod of the sliding resistor to the transmitting coil module, enables the transmitting coil module to drive the sliding rod to slide during the moving process. The controller determines the position information of the receiving coil according to the position signal and detects the current electrical parameters of the sliding resistor, and determines the current position information of the transmitting coil module according to the current electrical parameters, and controls the transmitting coil module to move, enabling the transmitting coil module to position and charge wirelessly with the receiving coil. Thereby, the wireless charging device may adapt to charging devices with receiving coils at different heights, and accurately position the transmitting coil module with the receiving coil for wireless charging, which has high applicability and may improve the user experience.

Figure 24:
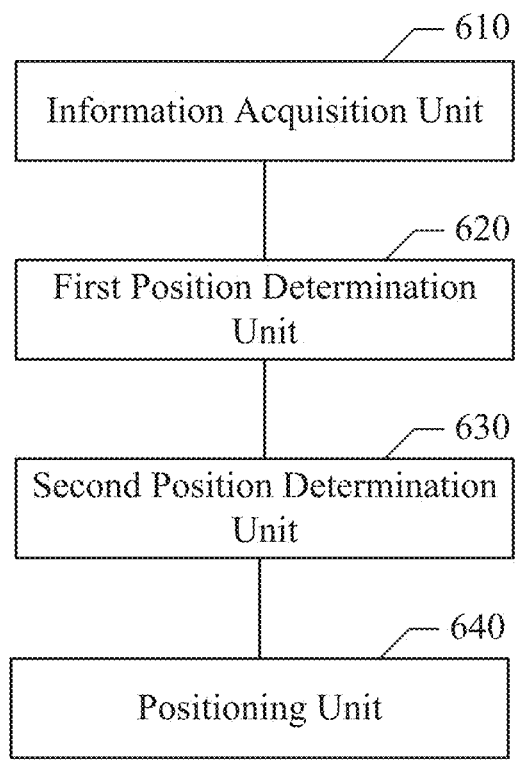
FIG. 24 is a schematic diagram of the wireless charging device according to an embodiment of the present disclosure.

FIG. 24 is a schematic diagram of the wireless charging device according to this embodiment. As shown in FIG. 24, the wireless charging device of this embodiment includes an information acquisition unit 610, a first position determination unit 620, a second position determination unit 630, and a positioning unit 640. The information acquisition unit 610 is used to obtain the position signal of the receiving coil and the current electrical parameters of the sliding resistor. The first position determination unit 620 is used to determine the position information of the receiving coil based on the position signal. The second position determination unit 630 is used to determine the current position information of the transmitting coil module based on the predetermined correspondence between the electrical parameters of the sliding resistor and the position information of the transmitting coil module, according to the current electrical parameters of the sliding resistor. The positioning unit 640 controls, according to the position information of the receiving coil and the current position information of the transmitting coil module, the transmitting coil module to move, enabling the transmitting coil module to position and charge wirelessly with the receiving coil.

The present disclosure, by movably setting the transmitting coil module within the wireless charging device, obtaining the position signal of the receiving coil to transmit to the controller, and connecting the sliding rod of the sliding resistor to the transmitting coil module, enables the transmitting coil module to drive the sliding rod to slide during the moving process. The controller determines the position information of the receiving coil based on the position signal and detects the current electrical parameters of the sliding resistor, and determines the current position information of the transmitting coil module according to the current electrical parameters, and controls the transmitting coil module to move, enabling the transmitting coil module to position and charge wirelessly with the receiving coil. Thereby, the wireless charging device may adapt to charging devices with receiving coils at different heights and accurately position the transmitting coil module with the receiving coil for wireless charging, which has high applicability and may improve the user experience.

The foregoing descriptions of specific embodiments of the present disclosure have been presented for purposes of illustration and description. They are not intended to be exhaustive or to limit the present disclosure to the precise forms disclosed, and obviously, many modifications and variations are possible in light of the above teaching. The embodiments were chosen and described in order to best explain the principles of the present disclosure and its practical application, thereby enable others skilled in the art to best utilize the present disclosure and various embodiments with various modifications as are suited to the particular use contemplated. It is intended that the scope of the present disclosure be defined by the claims appended hereto and their equivalents.

We claim:

1. A wireless charging device, wherein the wireless charging device comprises:
   a transmitting coil module, the transmitting coil module is movably set within the wireless charging device, and is configured to obtain a position signal of a receiving coil;
   a sliding resistor, including a sliding rod, the sliding rod is connected to the transmitting coil module, enabling the transmitting coil module to drive the sliding rod to slide during the moving process;
   a controller, electrically connected to the sliding resistor, the controller is configured to determine a position information of the receiving coil based on the position signal transmitted from the transmitting coil module and detect current electrical parameters of the sliding resistor, and determine a current position information of the transmitting coil module according to the current electrical parameters, and controlling the transmitting coil module to move, enabling the transmitting coil module to position and charge wirelessly with the receiving coil.

2. The wireless charging device according to claim 1, wherein the wireless charging device further comprises:
   a motor module, comprising a motor and a transmission mechanism;
   wherein, the controller is further configured to control the motor to drive the transmission mechanism to move the transmitting coil module.

3. The wireless charging device according to claim 2, the wireless charging device further comprises:
   a driving circuit, electrically connected to the motor and the controller;
   wherein, the controller is further configured to control the driving circuit to output a driving signal to transmit to the motor, enabling the motor to drive the transmission mechanism to move the transmitting coil module to a height corresponding to the driving signal.

4. The wireless charging device according to claim 3, wherein the wireless charging device further comprises:
   a power supply circuit, electrically connected to the controller and the transmitting coil module, for converting a direct current (DC) signal to an alternating current (AC) signal to be sent, to transmit to the transmitting coil module;
   wherein, the transmitting coil module is further configured to wirelessly transmit the AC signal to be sent to the receiving coil.

5. The wireless charging device according to claim 4, wherein the controller is further configured to:
   in response to the DC signal being detected, control the driving circuit to output a first driving signal, enabling the motor to drive the transmission mechanism to move the transmitting coil module from a first height to a second height, wherein the first height is less than the second height.

6. The wireless charging device according to claim 5, wherein the wireless charging device further comprises:
   an optical sensor, electrically connected to the controller, for detecting an optical signal to transmit to the controller;
   wherein, the controller is further configured to, in response to an intensity of the optical signal being less than a threshold value, control the driving circuit to output a second driving signal based on the position information of the receiving coil and the current position information of the transmitting coil module, enabling the motor to drive the transmission mechanism to move the transmitting coil module from the second height to a third height, thereby enabling the transmitting coil module to position and charge wirelessly with the receiving coil, the second height being greater than the third height.

7. The wireless charging device according to claim 6, wherein the controller is further configured to:
   in response to the intensity of the optical signal being greater than or equal to the threshold value, controlling the driving circuit to output a third driving signal, enabling the motor to drive the transmission mechanism to move the transmitting coil module from the third height to the second height.

8. The wireless charging device according to claim 6, wherein the wireless charging device further comprises:
   a backup power source, electrically connected to the power supply circuit;
   wherein, the power supply circuit is configured to generate a charging signal based on the DC signal, to transmit to the backup power source for charging.

9. The wireless charging device according to claim 8, wherein the wireless charging device further comprises:
   a power supply interface, configured to transmit the DC signal to the power supply circuit;
   wherein the backup power source is configured to supply power to the driving circuit when the wireless charging device is in a power-off state, and the power-off state represents that the power supply interface does not receive the DC signal provided by an external charging line.

10. The wireless charging device according to claim 8, wherein the backup power source is electrically connected to the controller, the controller is further configured to, in response to a discharge signal of the backup power source is detected and the intensity of the optical signal being greater than or equal to the threshold value, control the driving circuit to output a fourth driving signal, enabling the motor to drive the transmission mechanism to move the transmitting coil module from the third height to the first height.

11. The wireless charging device according to claim 1, wherein the position signal represents electrical parameters of the receiving coil, the controller is further configured to determine the position information of the receiving coil based on the electrical parameters of the receiving coil.

12. The wireless charging device according to claim 1, wherein the position signal represents the position information of the receiving coil, the controller is further configured to parse the position signal to determine the position information of the receiving coil.

13. The wireless charging device according to claim 4, wherein the transmitting coil module comprises:
   a first transmitting coil, electrically connected to the power supply circuit;
   a second transmitting coil, electrically connected to the power supply circuit;
   wherein, the first transmitting coil and the second transmitting coil are set at different heights of the transmitting coil module, the first transmitting coil or the second transmitting coil is configured to wirelessly transmit the AC signal to be sent to the receiving coil.

14. The wireless charging device according to claim 13, wherein the first transmitting coil and the second transmitting coil are electrically connected to the controller, the controller is further configured to:
   in response to electrical parameters of the first transmitting coil or the second transmitting coil meets a working parameter, control the transmitting coil module to move, enabling the first transmitting coil or the second transmitting coil to position and charge wirelessly with the receiving coil.

15. The wireless charging device according to claim 3, wherein the driving circuit comprises:
a resistor;
a driving chip, electrically connected to the motor through the resistor, the driving chip is configured to transmit the driving signal to the motor through the resistor.

16. The wireless charging device according to claim 15, wherein the resistor is electrically connected to the controller, the controller is further configured to:
in response to a current value represented by the driving signal is detected as being greater than a predetermined current value, control the driving chip to stop outputting the driving signal, for shutting down the motor.

17. The wireless charging device according to claim 8, wherein the power supply circuit comprises:
a voltage regulator circuit, for regulating the DC signal to obtain a regulated signal;
a buck circuit, electrically connected to the voltage regulator circuit, for reducing the regulated signal to obtain the charging signal.

18. The wireless charging device according to claim 17, wherein the power supply circuit further comprises:
a voltage booster, electrically connected to the voltage regulator circuit, for boosting the regulated signal to obtain a boosted signal;
an inverter, electrically connected to the voltage booster, for converting the boosted signal to an AC signal to be processed;
a resonant circuit, electrically connected to the inverter, for resonating the AC signal to be processed to obtain the AC signal to be sent.

19. The wireless charging device according to claim 1, wherein the controller is further configured to:
in response to a power signal being received, control the transmitting coil module to wirelessly charge the receiving coil using a power corresponding to the power signal.

20. A wireless charging method, comprises:
obtaining a position signal of a receiving coil and current electrical parameters of a sliding resistor;
determining, according to the position signal, a position information of the receiving coil;
determining, based on a predetermined correspondence between the electrical parameters of the sliding resistor and the position information of the transmitting coil module and according to the current electrical parameters of the sliding resistor, a current position information of the transmitting coil module;
controlling, according to the position information of the receiving coil and the current position information of the transmitting coil module, the transmitting coil module to move, enabling the transmitting coil module to position and charge wirelessly with the receiving coil.

\* \* \* \* \*